United States Patent
Narayanaswamy et al.

(10) Patent No.: US 8,706,545 B2
(45) Date of Patent: Apr. 22, 2014

(54) VARIABLE LEARNING RATE AUTOMATED DECISIONING

(75) Inventors: Deenadayalan Narayanaswamy, Alameda, CA (US); Marc-david Cohen, Ross, CA (US); Zhenyu Yan, El Cerrito, CA (US)

(73) Assignee: Fair Isaac Corporation, San Jose, CA (US)

( * ) Notice: Subject to any disclaimer, the term of this patent is extended or adjusted under 35 U.S.C. 154(b) by 1593 days.

(21) Appl. No.: 11/963,501

(22) Filed: Dec. 21, 2007

(65) Prior Publication Data

US 2009/0164274 A1 Jun. 25, 2009

Related U.S. Application Data

(60) Provisional application No. 60/891,191, filed on Feb. 22, 2007.

(51) Int. Cl.
*G06Q 30/02* (2012.01)
*G06Q 40/02* (2012.01)

(52) U.S. Cl.
CPC .............. *G06Q 30/02* (2013.01); *G06Q 40/02* (2013.01)
USPC ........................................ 705/7.33; 705/35

(58) Field of Classification Search
CPC .............................. G06Q 30/02; G06Q 40/02
USPC .................................... 705/7.33, 35
See application file for complete search history.

(56) References Cited

U.S. PATENT DOCUMENTS

| | | | |
|---|---|---|---|
| 2001/0020236 A1* | 9/2001 | Cannon ........................ | 707/1 |
| 2003/0115325 A1 | 6/2003 | Cohen et al. | |
| 2003/0208754 A1* | 11/2003 | Sridhar et al. ................. | 725/34 |
| 2006/0200541 A1* | 9/2006 | Wikman et al. ............... | 709/223 |
| 2007/0112615 A1* | 5/2007 | Maga et al. ..................... | 705/10 |

FOREIGN PATENT DOCUMENTS

WO          WO 00/70481      * 11/2000

OTHER PUBLICATIONS

I. Cohen, A. Bronstein, and F. Cozman, Adaptive Online Learning of Bayesian Network Parameters, http://www.hpl.hp.com/techreports/2001/HPL-2001-156.pdf (2001).

* cited by examiner

*Primary Examiner* — Ella Colbert
*Assistant Examiner* — Abdulmajeed Aziz
(74) *Attorney, Agent, or Firm* — Mintz Levin Cohn Ferris Glovsky and Popco, P.C.

(57) ABSTRACT

Methods and related system are described for making decisions. A described method includes selecting a choice from the available choices, receiving an outcome relating to the selected choice, and automatically learning from the received outcome by incorporating the received outcome into subsequent steps of selecting a choice. The method may also include calculating estimated probabilities associated with the each choice using Bayesian networks. The automated learning can be based on a learning rate which is variable with time, and influences the degree on which prior outcomes are relied upon when calculating an estimated probability associated with a choice. The learning rate can be a function of time and an estimate of drift of the probability associated with the selected choice.

37 Claims, 16 Drawing Sheets

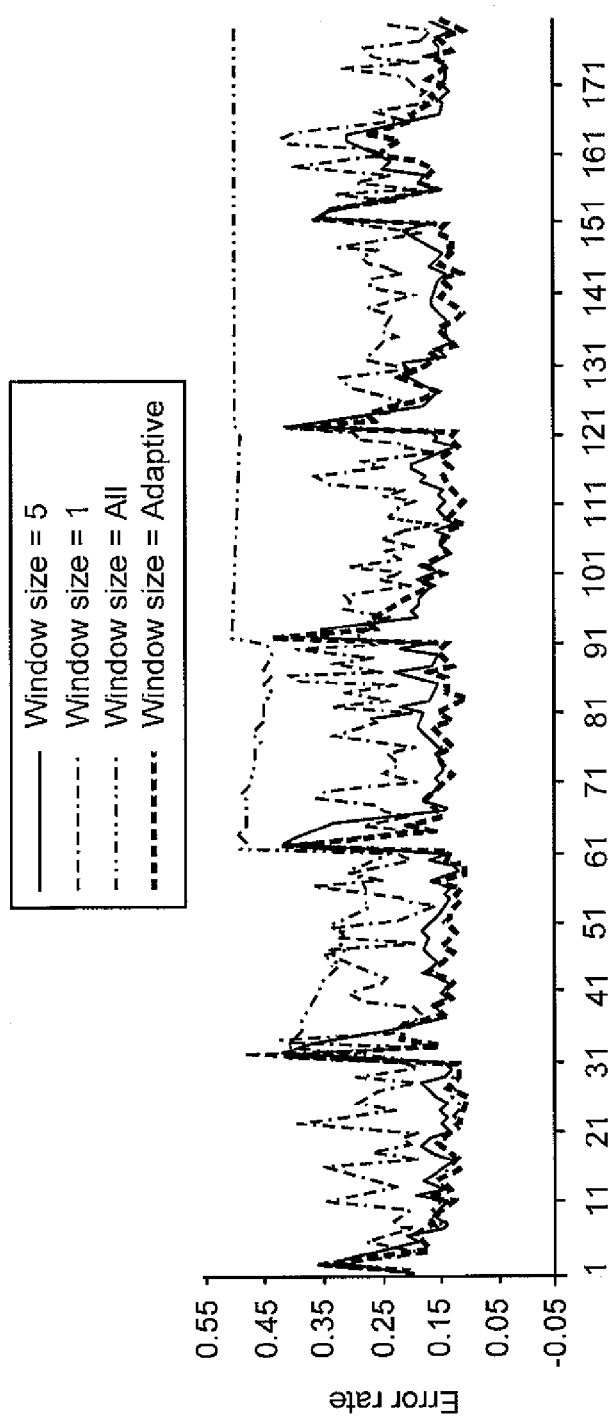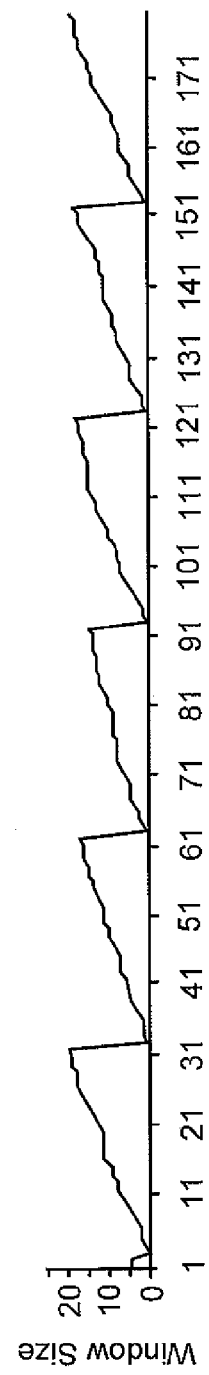
FIG. 13a
FIG. 13b

VARIABLE LEARNING RATE AUTOMATED DECISIONING

CROSS REFERENCE TO RELATED APPLICATION

This present application claims priority under 35 U.S.C. §119 to U.S. Provisional application Ser. No. 60/891,191, filed Feb. 22, 2007,the disclosure of which is incorporated herein by reference.

FIELD

This patent specification relates to automated decisioning. More particularly, this patent specification relates to systems and methods for automated decisioning having variable learning rates.

BACKGROUND

Automated decisioning systems have been developed to aid people and businesses to make faster, fact-based decisions in business settings. Typically, automated decisioning systems enable the user to make real-time, informed decisions, while minimizing risk and increasing profitability. Decisioning systems can be used to quickly assess risk potential, streamline account application processes, and apply decision criteria more consistently for approving decisions and/or selling new products or services.

Conventionally, decision-making models or decisioning models have been manually or custom developed by human analysts. They have been deployed, often with the use of scoring software systems where the models score out incoming data. These conventional models do not use the data they were scoring out on to update themselves. Furthermore, they do not use the outcome of their decisions to update themselves. Since the incoming data characteristics in the real world tend to change over time, the models tend to degrade in performance unless they are updated. This updating process has also been conventionally undertaken manually by human analysts. The more quickly the trends and behavior patterns change, the shorter the lifespan of the model, and historic data becomes increasingly unreliable. Furthermore, conventional models do not normally take account of frequently changing lists of eligible choices.

SUMMARY

An adaptive decisioning system for making decisions between available choices can be provided. The system includes a processor arranged and programmed to select a choice from the available choices based at least in part on evaluating a plurality of prior outcomes for the available choices, wherein the number of prior outcomes evaluated varies with time. According to certain embodiments, the system includes an input/output system in communication with the processor and arranged to communicate the selected choice to a user and to receive an outcome relating to the selected choice, and the processor automatically learns from the outcome by basing at least some subsequently calculated estimated probabilities on the outcome. Based on further embodiments the process is further programmed to calculate estimated probabilities associated with each choice based at least in part on evaluating a number of prior outcomes for the each choice, and the selection of a choice is based at least in part on the calculated estimated probabilities. The number of prior outcomes evaluated for the each choice can be based at least in part on an estimate of drift of the estimated probability associated with the that choice. The processor can be further programmed such that the selected choice is at least sometimes a sub-optimal choice such that outcome relating to the sub-optimal choice can be obtained, and the sub-optimal choice is selected at a rate that is proportional to an estimated probability associated with the sub-optimal choice.

According to other embodiments, a method for adaptively making decisions between available choices including at least a first choice and a second choice is provided. The method includes selecting a choice from the available choices; receiving an outcome relating to the selected choice; and automatically learning from the received outcome by incorporating the received outcome into subsequent steps of selecting a choice. The method also can also include calculating a first estimated probability associated with the first choice; calculating a second estimated probability associated with the second choice, wherein the step of selecting a choice is based at least in part upon the calculated first and second estimated probabilities, and the received outcome is incorporated into subsequent steps of calculating estimated probability associated with the selected choice. The automatic learning can be based on a learning rate which is variable with time, and influences the degree on which prior outcomes are relied upon when calculating an estimated probability associated with a choice. The learning rate can be a function of time and an estimate of drift of the probability associated with the selected choice.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIG. 13a shows error rates for nearest neighbor algorithms having different window sizes;

FIG. 13b shows the adaptively updated window size that were used for the data shown in FIG. 13a;

DETAILED DESCRIPTION

Adaptive analytics based algorithms can be used in statistical models to provide the capability of realtime automated update of the models in deployment. It has been found that an important factor in self-updating models used for decisioning is the learning rate. The rate at which the model is updated is very important in balancing two considerations; (1) keeping the error rate (which leads to wrong decisions) relatively low; and (2) keeping the rate of learning relatively high whenever the environment (incoming data characteristic or the correct decision) changes to quickly adapt to the change. It has been found that variable learning rate models perform well under many real-world decisioning situations to balance these two considerations.

One example of automated decisioning with variable learning rate has been applied to decisions regarding making either an offer for a first product or service, or an offer for a second product or service, to a customer based on the customer's profile. The model recommends which product to offer to a customer based on known customer information. The feedback given back to the model includes whether the recommended offer was accepted or not. The learning occurs with this feedback by updating the model. With the update, there is an increase or decrease in the probability of accepting this offer by a customer with the same characteristics value. To understand whether different offers would be accepted by customers of specific type or profile, alternate or non-optimal offers are sometimes made to customers and the feedback received and model is updated.

Figure 1:
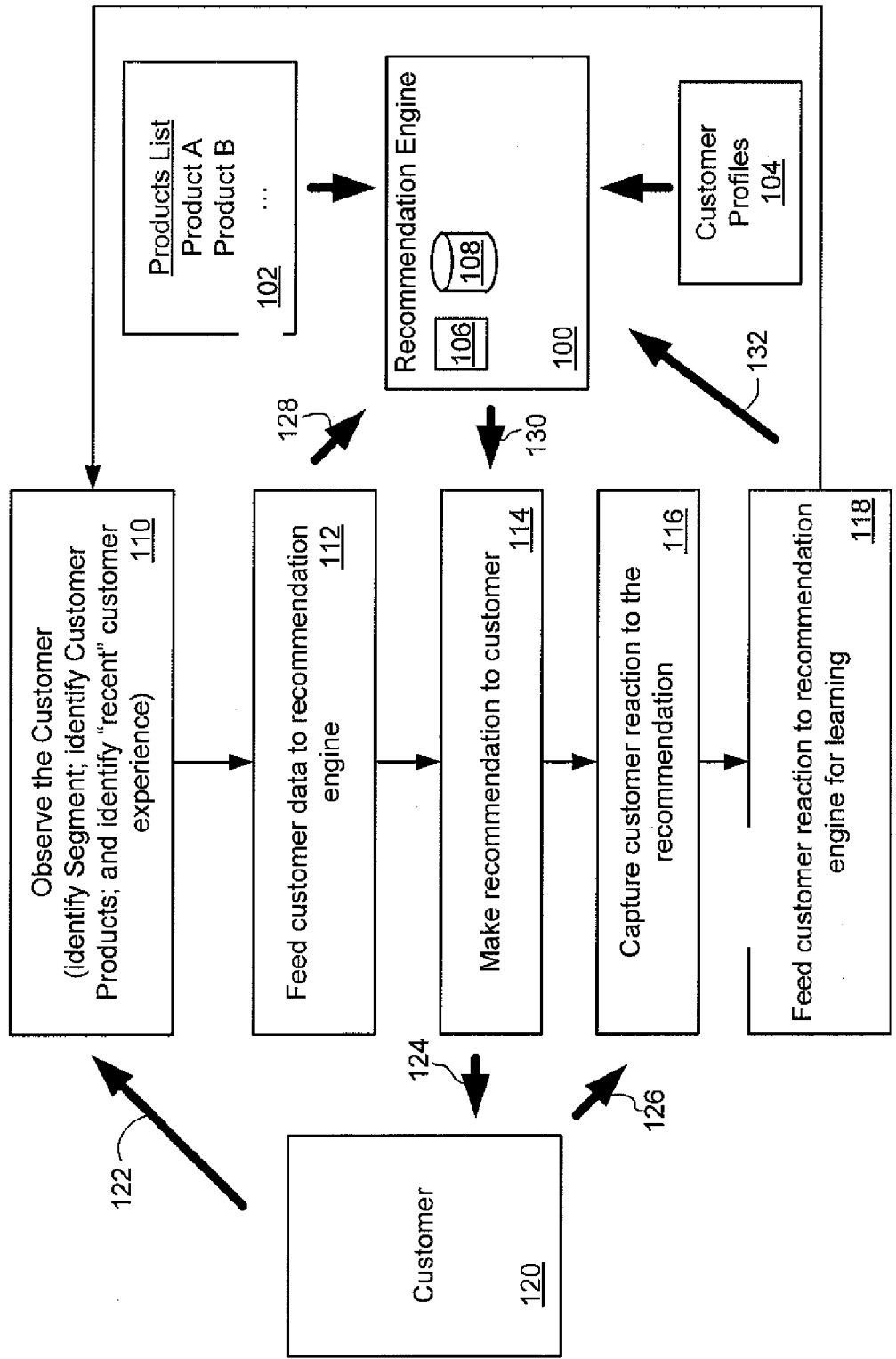
FIG. 1 shows an example system with an adaptive model.

FIG. 1 shows an example system with adaptive model. Recommendation engine 100 is computer implemented and has access to products list 102 and customer profiles 104. Recommendation engine 100 is implemented on a general purpose computer including at least one processor 106, memory storage 108 and input output devices including user interfaces (not shown). Recommendation engine may also be implemented on a network of computers. In the example shown in FIG. 1, recommendation engine 100 is being used to make recommendations for products to a customer 120. Steps 110, 112, 114, 116 and 118 are shown and may be partially or fully carried out by the recommendation engine 100. In step 110, the customer is observed. Information from the customer 120 is shown with arrow 122, and can be collected for example by a person in a face-to-face or telephone conversation, an on-line user profile via the internet, operator personal knowledge, or other means. The customer information 122 is used to identify the correct customer segment using variables such as age, gender, income, and geographic location. Depending upon the implementation of the system, a list of customer products may be identified from products list 102 that is a subset of list 102. Recent customer experiences may also be identified in step 110. Such recent customer experiences include what offers a customer of the same segment has recently accepted, how such customers behaved or reacted, etc. In step 112 the computer data is fed to the recommendation engine, as shown by arrow 128, in cases where step 110 is not being implemented within recommendation engine 100. In step 114, recommendation engine 100 makes a recommendation 130 based on the customer data 128, the products in product list 102 (or subset of those products as identified in step 110). The recommendation 130 may be, for example to offer "Product B" or sale to customer 120, from a list that included "Product A", "Product B" and "Product C." The system, which may include other computer systems and/or human operators, can follow the recommendation 130 from recommendation engine 100 and make an offer to customer 120 shown as arrow 124 which matches recommendation 130. Customer 120 then makes his or her own decision with respect to the offer 124, for example either accepting or rejecting the offer 124. In step 116, the customer's reaction 126 to recommendation 124 is captured. In step 118, the customer's reaction is fed back to the recommendation engine 100 as shown by arrow 132 which is used for learning by recommendation engine 100.

Figure 2:
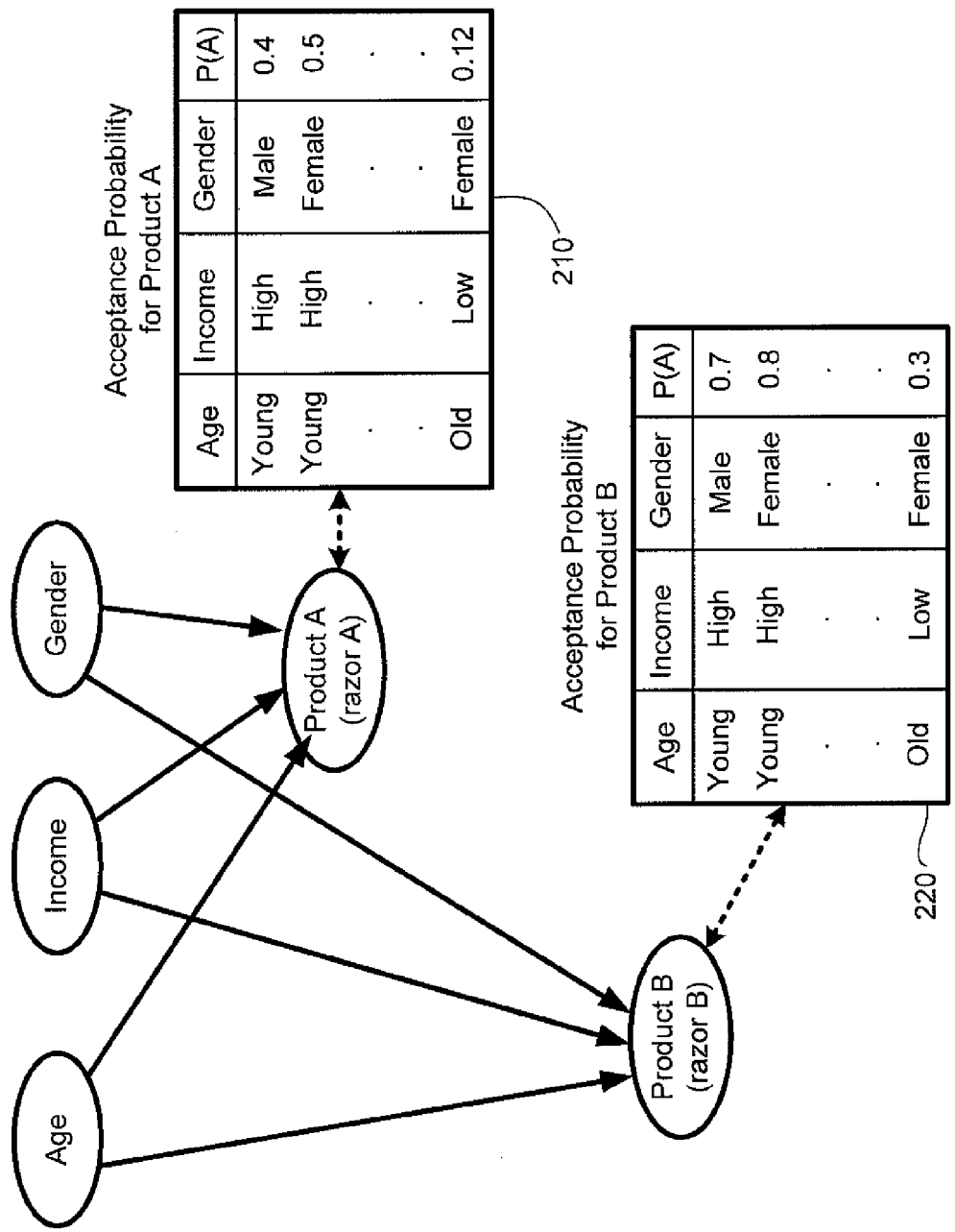
FIG. 2 shows further detail of a decisioning models used for a recommendation engine.

FIG. 2 shows further detail of a decisioning models used for a recommendation engine. The models used in FIG. 2 for making decisions between alternate offers for two products "Razor A" and "Razor B" are based on simple Bayesian networks. Probability model 210 gives the estimated acceptance probability for product Razor A for each of several customer segments. As shown the segment categories "Age", "Income" and "Gender" are used as inputs to model 210 for Razor A. The current estimated acceptance probability for customer segment Age=Young, Income=High, and Gender=Male is 0.4 as shown in FIG. 2. Similarly, probability model 220 gives the estimated acceptance probability for product Razor B for each of the customer segments. Model 220 returns the estimated acceptance probabilities for each of the customer segments as shown. The probabilities for the offer of Razor A and the offer for Razor B given by models 210 and 220 respectively are then compared and a decision is made on which offer to actually make to the customer. Once a particular offer is made to the customer, he/she either rejects or accepts the offer. This feedback information is sent back to the network corresponding to that offer as feedback. The probability value corresponding to the customer in the offer's network is updated with this information.

Further detail of the statistical models are provided below. The model used to estimate the probability of accepting an offer i at time t can be represented:

$$\hat{p}_i(t)=(1-\eta)\hat{p}_i(t-1)+\eta I_i(t)$$

where $\eta$ is the learning rate parameter, which controls how much the past is relied upon. As $\eta$ approaches 1, the past is weighted less, and as $\eta$ approaches zero, the network parameters change slowly from the previous model. $I_i(t)$ is the feedback indicator function for offer i at the time t, which can be either 1 or 0:

$$I_i(t) = \begin{cases} 1 & \text{with probability } p_i \\ 0 & \text{with probability } 1-p_i. \end{cases}$$

As described herein, separate models $\hat{p}(t)$ can be used for each combination of segment (for example, customer age, income, gender, etc.) and offer type (for example, offer to sell cellphone A, cellphone B, etc.). The optimum offer to make to the customer in a segment at a given time is then:

$$i^*(t) = \underset{i}{\operatorname{argmax}} \hat{p}_i(t).$$

A simple probability table can be used for the model $\hat{p}_i(t)$, where for every possible combination of input values there is an output probability value. The predication model takes as inputs values characteristics of the object on which a prediction needs to be made. Shown in Table 1 and Table 2 is a simple model for two offers that takes as input the characteristics of a customer and produces the predicted acceptance rate for a given offer as the output. Tables 1 and 2 also correspond to models 210 and 220 respectively as shown in FIG. 2. To select the best offer, the customer's characteristics are used on the various models, and the best offer is selected. Criteria for selecting the best offer, or the optimal offer, is based on the highest estimated acceptance probability. The highest estimated acceptance probability can be simply selected as the optimal, or more complex criteria can be used to select the optimal offer such as estimated profit, increased retention probability, some other metric, or a combination of these.

TABLE 1

Probability Table for Offer 1

| Age | Income | Gender | P(A) |
|---|---|---|---|
| Young | High | Male | 0.4 |
| Young | High | Female | 0.5 |
| ... | ... | ... | ... |
| ... | ... | ... | ... |
| Old | Low | Female | 0.12 |

TABLE 2

Probability Table for Offer 2

| Age | Income | Gender | P(A) |
|---|---|---|---|
| Young | High | Male | 0.7 |
| Young | High | Female | 0.8 |
| ... | ... | ... | ... |
| ... | ... | ... | ... |
| Old | Low | Female | 0.3 |

Figure 3:
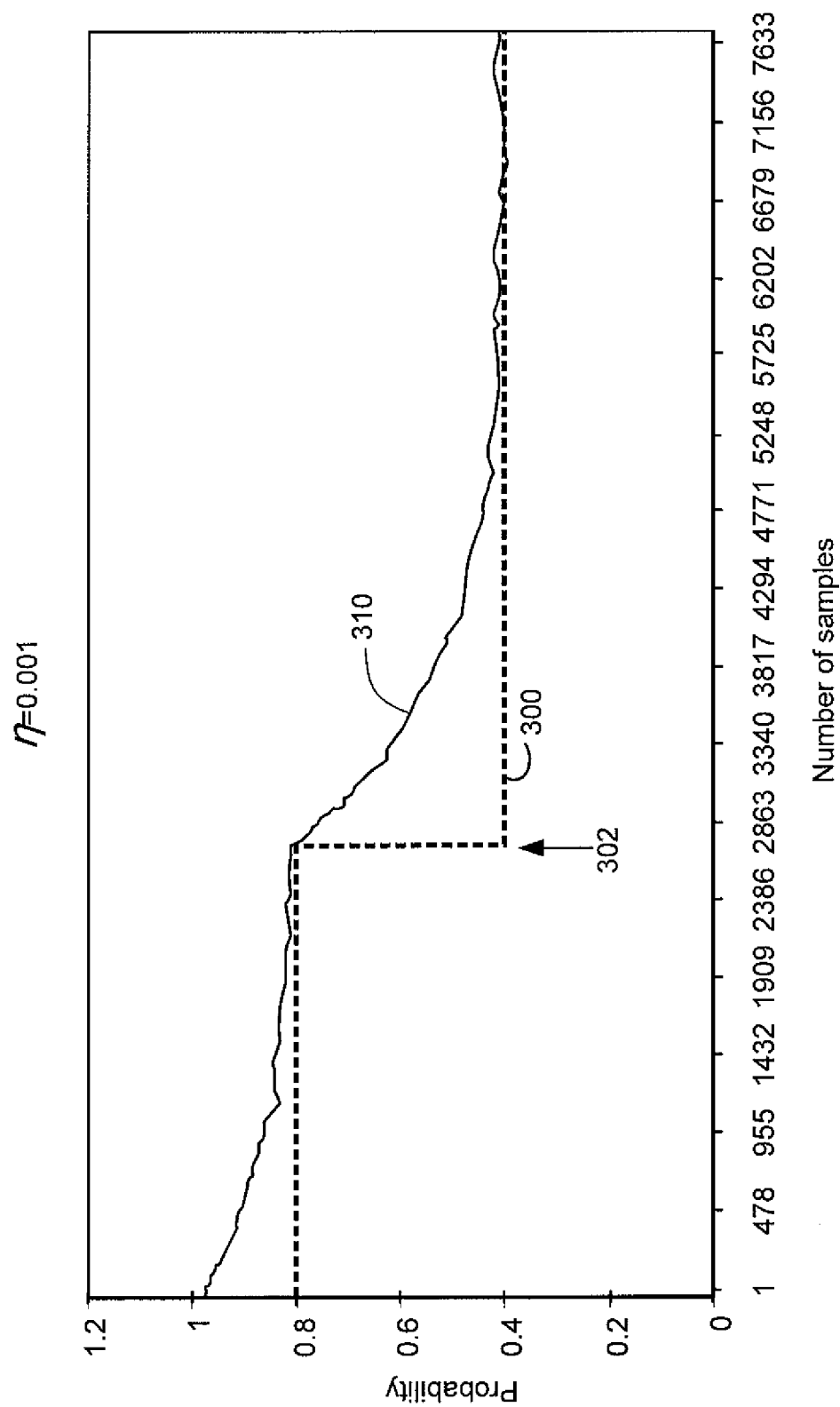
FIG. 3 shows an example of a probability model having a relatively slow learning rate.

FIG. 3 shows an example of a probability model having a relatively low learning rate. Curve 300 is the true probability of acceptance of an offer $p_i(t)$, which is not seen or known in the real world, showing an abrupt change at point 302. Curve 310 is the probability $\hat{p}_i(t)$, estimated according to a learning model described above having a learning rate=0.001. Note that although the estimated probability tracks the true probability closely after many samples, the model doesn't react quickly to changes in the underlying probability.

Figure 4:
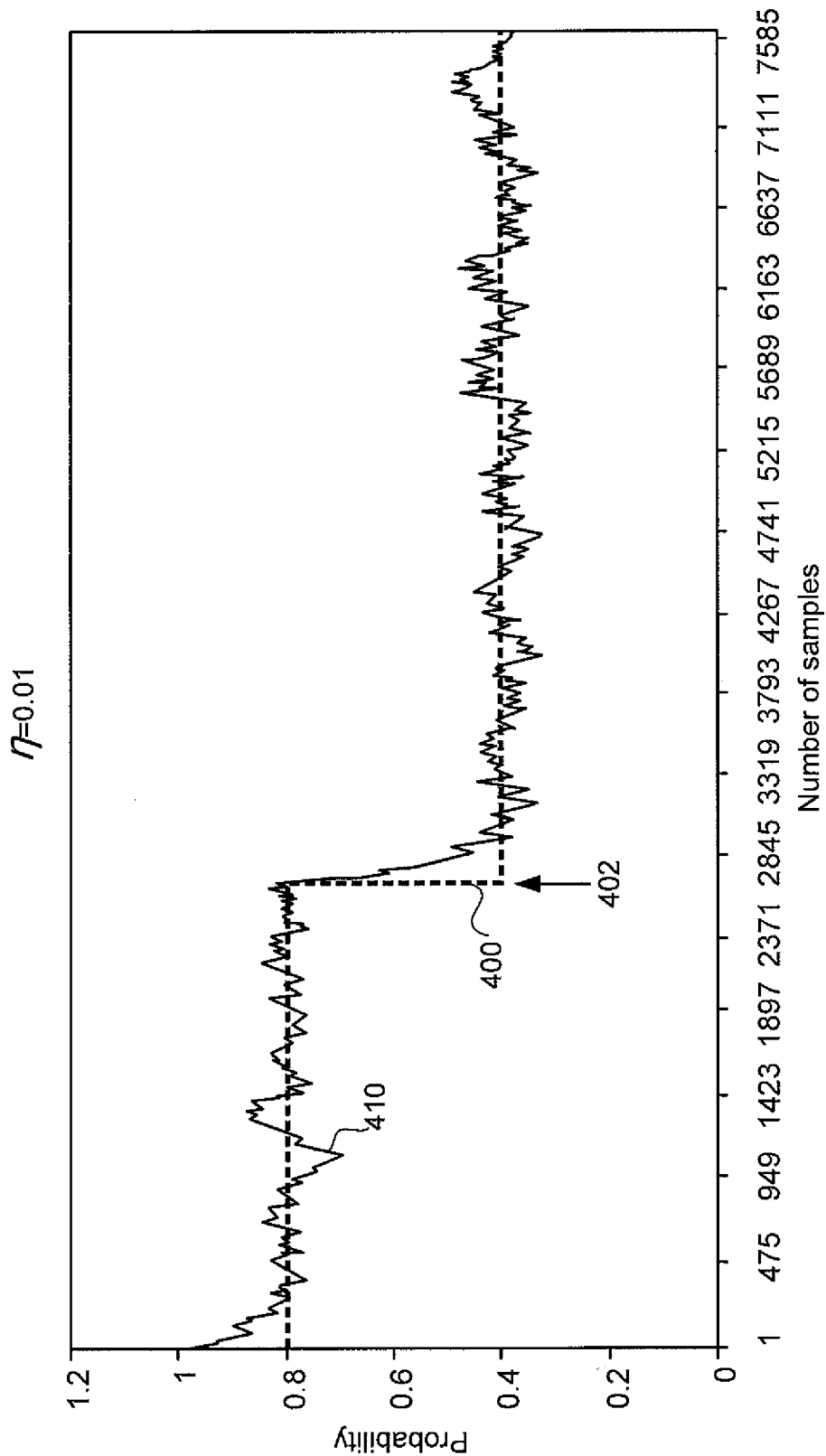
FIG. 4 shows an example of a probability model having a relatively fast learning rate.

FIG. 4 shows an example of a probability model having a relatively fast learning rate. Curve 400 is the true probability of acceptance of an offer $p_i(t)$ showing an abrupt change at point 402. Curve 410 is the probability $\hat{p}_i(t)$, estimated according to a learning model described above having a learning rate 0.01. Note that although the estimated probability reacts quickly to changes in the underlying probability, it exhibits relatively wide swings above and below the true probability when the underlying probability remains relatively stable.

A variable learning rate can be provided. One example of a dynamic learning rate in the context of prediction Bayesian networks, as opposed to decisioning systems, is described in I. Cohen, A. Bronstein, and F. Cozman, Adaptive Online Learning of Bayesian Network Parameters, HPL-2001-156.pdf (2001), and in United States Patent Application Pub. No. US2003/0115325, both of which are incorporated by reference herein. In order to understand the changes in the underlying model in real time, capture that change and take action, the above formulae are modified. The new formulae makes the learning rate a function of both: t (counts of the observations); and how far the estimate is away from the moving average over a period of a number of run. It has been found, for example, that for many applications, the deviation from a moving average of 100 runs is suitable.

The average and sample standard deviation of the adaptive learning algorithm $\hat{p}_i(t)=(1-\eta)\hat{p}_i(t-1)+\eta I_i(t)$ can be given by:

$$\eta \propto t \text{ and } \left|\hat{p}(t) - \sum_k \alpha^k \hat{p}(t-k)\right|.$$

In other words, the learning parameter is both a function of time and of the estimated drift. In one variation, the foregoing formulae is implemented using the following computer code:

```
calculateNewLearningRate(GoalLearningRequest glr,
            INetwork network,
            double acceptanceProb,
            int adaptiveLearningIndex)
{
    int tMax=1500;
    int tTarget=1000;
    double q=0.09; //confidence in the decision to increase
    learning rate.
    double alpha = 0.1;//threshold reflecting the acceptable
    convergence
    double m = 2.0;
    double oldLearningRate =
        network.getLearningRate(adaptiveLearningIndex);
    double newLearningRate = oldLearningRate;
    int runLimit=25;
    int t = network.getT(adaptiveLearningIndex);
    double prevMovingAvgDiff =
        network.getPrevMovingAvgDiff(adaptiveLearningIndex);
    double initialAcceptanceValue =
        network.-
        getInitialAcceptanceValue(adaptiveLearningIndex);
    int deltaT = network.getDeltaT(adaptiveLearningIndex);
    double runningAvg =
        network.getRunningAvg(adaptiveLearningIndex);
    int runningAvgCount =
        network.getRunningAvgCount(adaptiveLearningIndex);
    int lastSawP = network.getLastSawP(adaptiveLearningIndex);
    int lastSawN = network.getLastSawN(adaptiveLearningIndex);
    t++;
    if (t <=2)
    {
        initialAcceptanceValue = acceptanceProb;
        //return oldLearningRate;
        deltaT++;
        runningAvg =runningAvg +acceptanceProb;
        runningAvgCount++;
        network.setT(t, adaptiveLearningIndex);
        network.setPrevMovingAvgDiff(prevMovingAvgDiff,
            adaptiveLearningIndex);
        network.setInitialAcceptanceValue(initialAcceptanceValue,
            adaptiveLearningIndex);
        network.setDeltaT(deltaT, adaptiveLearningIndex);
        network.setRunningAvg(runningAvg,
            adaptiveLearningIndex);
        network.setRunningAvgCount(runningAvgCount,
            adaptiveLearningIndex);
        network.setLastSawP(lastSawP, adaptiveLearningIndex);
        network.setLastSawN(lastSawN, adaptiveLearningIndex);
        return oldLearningRate;
    }
    double powerT = Math.pow(1-oldLearningRate, t);
    double eAcceptanceProb = (powerT*initialAcceptanceValue)+
            ((1-powerT)*acceptanceProb);
    double varianceAcceptanceProb=
        (oldLearningRate*acceptanceProb*(1-acceptanceProb))/
        (2-oldLearningRate);
    varianceAcceptanceProb= varianceAcceptanceProb*
        (1-Math.pow((1-oldLearningRate), 2*deltaT +2));
```

```
if (Math.abs(acceptanceProb-eAcceptanceProb)>
    q*varianceAcceptanceProb)
{
  newLearningRate = newLearningRate * m;
  deltaT =0;
  runningAvg =acceptanceProb;
  runningAvgCount =1;
  //t=0;
}
else
if (Math.pow((1-oldLearningRate),deltaT)<=alpha)
{
  newLearningRate = newLearningRate /(2* m);
  deltaT =0;
  runningAvg =runningAvg +acceptanceProb;
  runningAvgCount++;
}
else
{
  deltaT++;
  runningAvg =runningAvg +acceptanceProb;
  runningAvgCount++;
}
```

Figure 5:
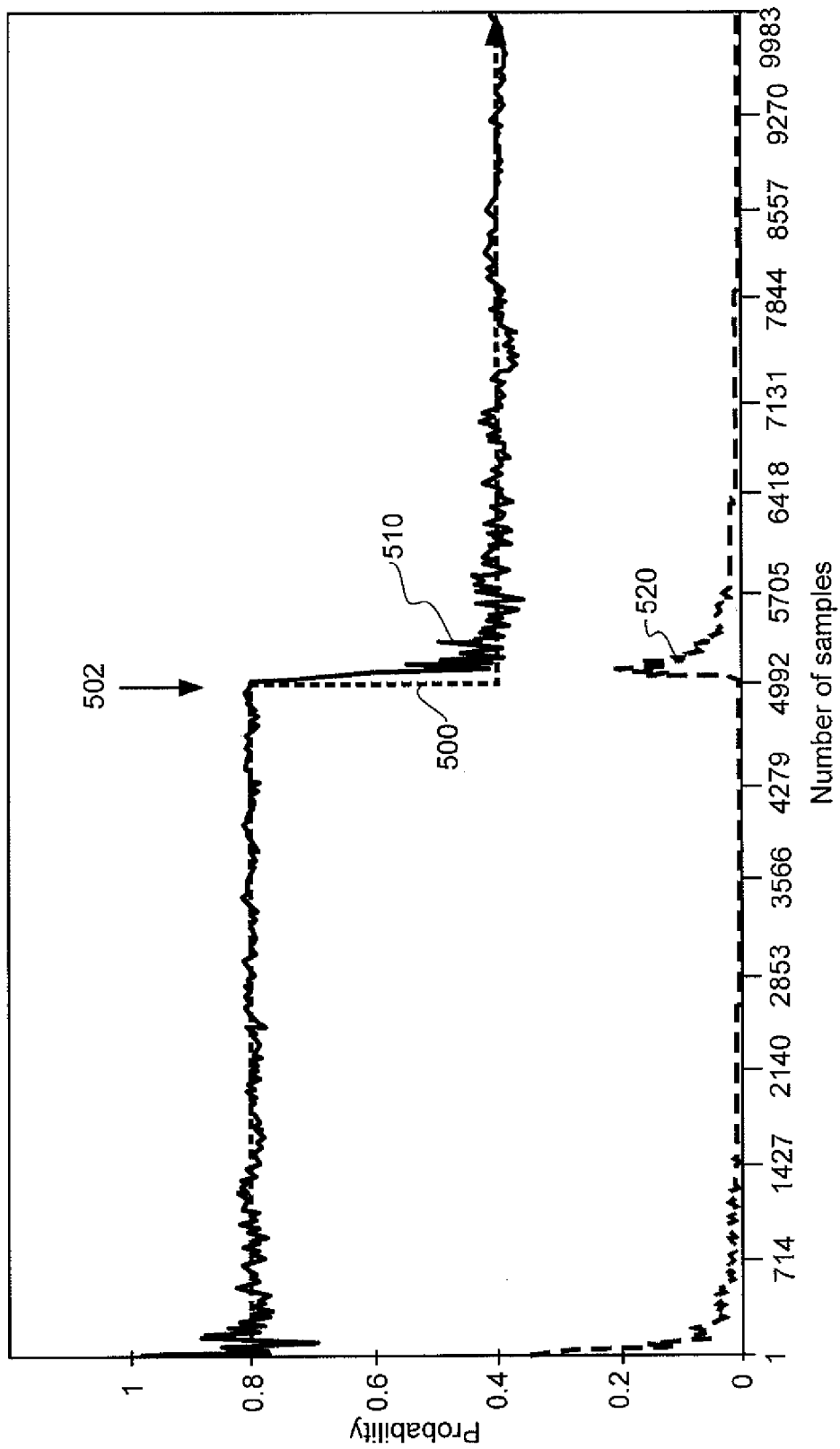
FIG. 5 shows the probability of acceptance versus the estimated probability.

FIG. 5 shows the probability of acceptance versus the estimated probability. Curve 500 is the probability of acceptance of an offer $p_i(t)$, showing an abrupt change at location 502. Curve 510 is the probability $\hat{p}_i(t)$, estimated according to the adaptive learning model described above. Curve 520 is a moving average of the difference between the actual probability and the estimated probability (drift). Note that the estimated probability of curve 512 tracks the true probability much more closely than the estimated probabilities with fixed learning rates shown in FIGS. 3 and 4. The estimated probability shown in FIG. 5 also reacts more quickly and accurately to changes than in either of the cases shown and described in FIG. 3 and FIG. 4. The adaptive learning model shown in FIG. 5 achieves better tracking of the underlying probability whenever it changes and also minimizes error whenever the model remains relatively steady by reducing the learning rate, and hence the error rate.

Active experimentation can be used in the learning process for decisioning systems—where decisions are recommended for more than one offer. It has been found that the decisioning system should make non-optimal offers (i.e. alternate offers), going against what the model recommends, in order to generate new training data for non-optimal target values. In order to learn how a particular customer type would respond to non optimal (according to the model) offers, such non-optimal offers need can be made at regular intervals. Without the use of experimentation, the optimum offer (e.g. with the highest value or greatest probability of being accepted) is always selected. In this case it becomes difficult or impossible to detect changes in the other, non-optimal offers. Unless the non-optimal offers are very close to the optimal offer, the non-optimal offers will never be selected and therefore those models will not detect changes with respect to those non-optimal offers. Thus in real world applications when making decisions among multiple offers whose probabilities are changing with time, simply selecting the optimal offer without experimentation will not allow for determining the accurate estimates of non optimal offer's acceptance probability.

Figure 6:
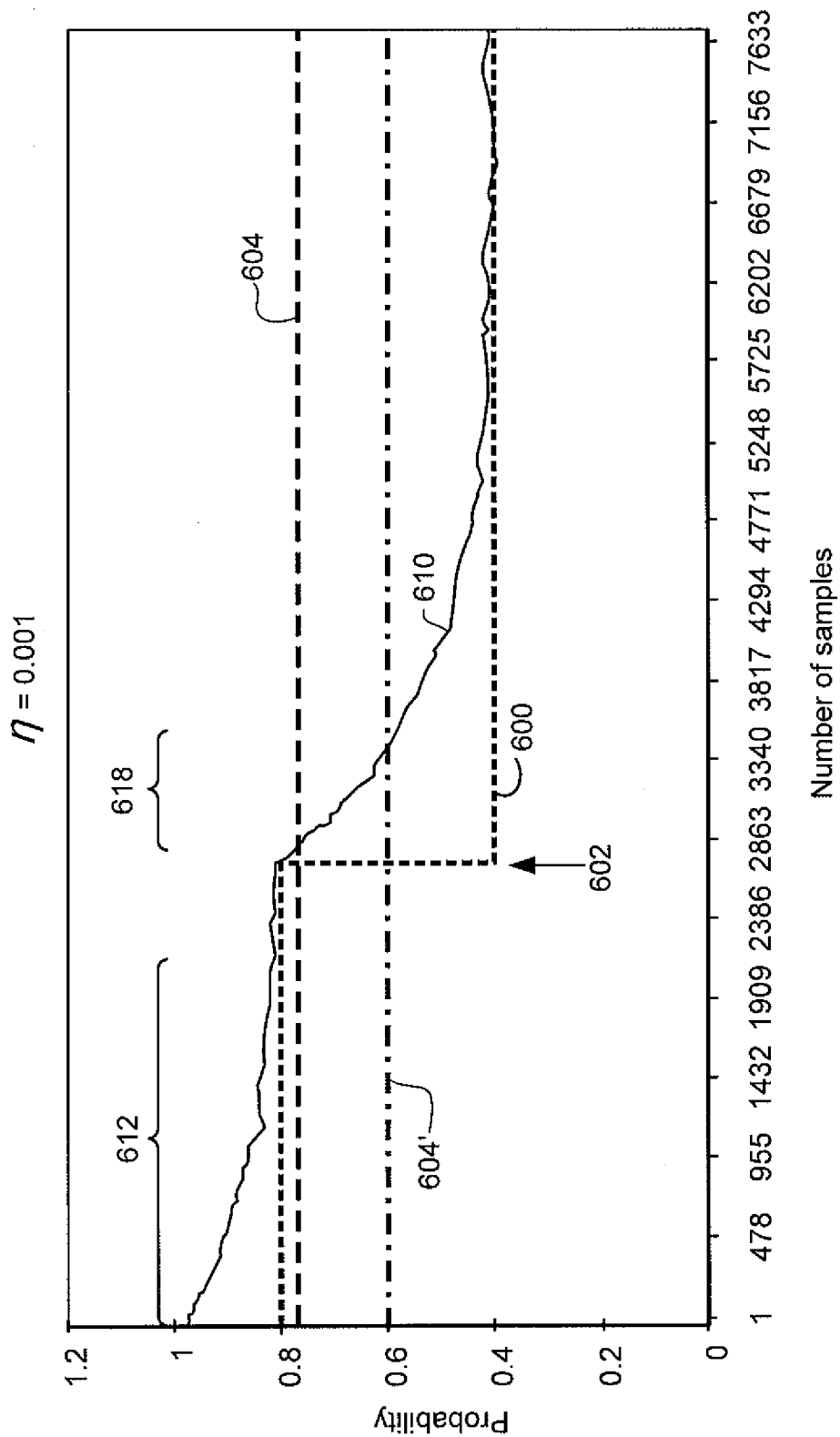
FIG. 6 shows a decisioning scenario where a decision is being recommended to make one of two or more different offers.

FIG. 6 shows a decisioning scenario where a decision is being recommended to make one of two or more different offers. The probability of acceptance of a first offer (offer "A") is shown by curve 600. Note that the acceptance probability has an abrupt change at location 602. The acceptance probability of a second offer (offer "B") is shown by curve 604. In this scenario, the acceptance probability of the second offer is just slightly lower than the initial value for the first offer. Curve 610 is an estimated acceptance probability for the first offer. In this scenario, the learning rate η for the model shown in curve 610 is constant and relatively low, equal to 0.001. A second model is used to estimate the acceptance probability of the second offer, but is not shown in FIG. 6. An alternate second offer curve 604' is shown in FIG. 6.

Figure 7:
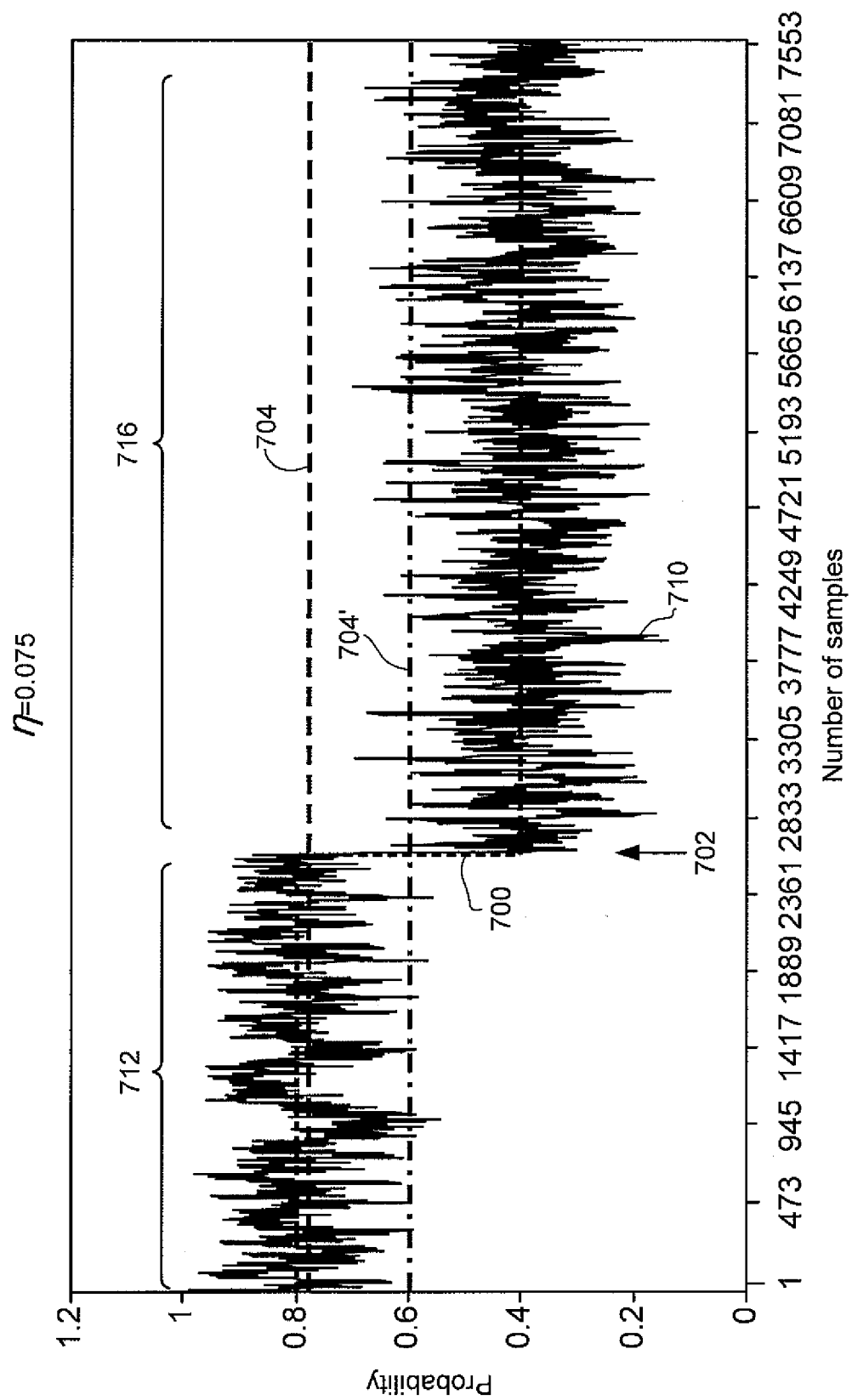
FIG. 7 shows a decisioning scenario where a decision is being made to make one of two or more different offers.

FIG. 7 shows a decisioning scenario where a decision is being made to make one of two or more different offers. The probability of acceptance of a first offer (offer "A") is shown by curve 700. Note that the acceptance probability has an abrupt change at location 702. The acceptance probability of a second offer (offer "B") is shown by curve 704. The acceptance probability of the second offer shown in curve 704 is slightly lower than the initial value for the first offer. Curve 710 is an estimated acceptance probability for the first offer. In this scenario, the learning rate η for the model shown in curve 710 is constant and relatively high, equal to 0.075. A second model is used to estimate the acceptance probability of the second offer, but is not shown in FIG. 7. Also shown in FIG. 7 is the acceptance probability of an alternate second offer, curve 704', which is substantially lower than the initial value for the first offer.

Note that when the second best offer is close to the most likely accepted offer, there will not be much loss with both a low and high learning rates. In FIG. 6, this is shown in region 612 for a low learning rate with the first offer, curve 600 and the second offer, curve 604. In FIG. 7 this is shown in region 712 for a high learning rate with the first offer, curve 700 and the second offer, curve 704. Note that in FIG. 7, with a high learning rate there are wide fluctuations in the estimated acceptance probability for the first offer, curve 710, but there is not much loss since the two offers are so close to each other.

On the other hand, when the offers are quite different in terms of their response rates, a higher learning rate causes a faster capture of the change but also causes many more errors due to the high variance in the expected rate. In FIG. 7, this is shown in region 716 with the first offer, curve 700, and the second offer, curve 704'. A lower learning rate causes a slower detection of the change but causes fewer errors. This shown in FIG. 6 where in region 618 the first offer will tend to be recommended but the second offer in fact has a higher acceptance probability. To balance between the two learning rates and use the right learning rate at the right condition, adaptive learning rate is used as described herein.

Making non optimal offers involves a cost higher than that of offering the optimal offer and hence should be minimized. At the same time, making non optimal offers is required to detect changes in the customer preferences. It has been found that the rate at which the alternate offers, or non-optimal offers, are made can be tied to the learning rate, which can be calculated as described above. Thus the rate at which alternate, or non-optimal offers are made can be governed by the learning rate: increasing when the learning rate is high and decreasing when it is low.

As in the context of predicting with respect to a single offer, with two or more offers decisioning systems with slow learning have more exposure to systematic errors, such as shown in FIG. 6, and decision systems with fast learning have more exposure to random errors, such as shown in FIG. 7. Note that in general, the probability of making a non-optimal recommendation depends on the difference between the actual acceptance probabilities.

Since the decision rule $$i^*(t) = \arg\max_i \hat{p}_i(t)$$

does not drive estimates of the alternative offers, alternative offers need to be tried to estimate the alternative offer probabilities. In one variation, a simple method for experimentation is to select the offers according to the probability of that offer being accepted over the sum of the probabilities of all the offers. In other words, an offer j is selected with having probability:

$$\frac{\hat{p}_j}{\sum_i \hat{p}_i}$$

It has been found that, in general, more effective results are achieved when the learning rate is incorporated. Relying on the convergence of the estimate, bias the selection towards i* by weighting the sum by the learning parameter.

$$\frac{\hat{p}_j}{\hat{p}_{i^*} + \sum_{i \neq i^*} \hat{p}_i \eta \gamma}$$

where γ is a scaling parameter. The above formula can be implemented using the following computer code:

```
private String recommendOffer(GoalOfferRecommendationImpl[ ]
        goalOfferRecommendations)
{
    //make a recommendation that is a random distribution
    //sum all the probabilities.
    //multiple sum by the random number
    //return the offerId whose sigma probability is grter than the product.
    double probSum=0;
    //double activeLearningFactor=
        bestNetwork.getLearningRate(adaptiveLearningIndex);
    activeLearningFactor=activeLearningFactor*10;
    if (activeLearningFactor>1.0) activeLearningFactor=1.0;
    for(int i=0; i<goalOfferRecommendations.length; i++)
    {
        if (i!=bestIndex)
            probSum = probSum+
                (activeLearningFactor*goalOfferRecommendations[i].
                getAcceptanceProbability( ));
        else
            probSum = robSum+
                goalOfferRecommendations[i].getAcceptanceProbability( );
    }
    probSum = probSum*r.nextDouble( );
    double cummSum=0;
    for(int i = 0; i < goalOfferRecommendations.length; i++)
    {
        if (i!=bestIndex)
            cummSum = cummSum +
(activeLearningFactor*goalOfferRecommendations[i].-
getAcceptanceProbability( ));
        else
            cummSum = cummSum +
                goalOfferRecommendations[i].getAcceptanceProbability( );
        if (cummSum > probSum)
        {
            if
(!goalOfferRecommendations[i].getOfferId( ).-
equalsIgnoreCase(bestOfferId))
            {
                alternateOffer=1;
                return goalOfferRecommendations[i].getOfferId( );
            }
            else{
                alternateOffer=0;
                //return null;
                return goalOfferRecommendations[i].getOfferId( );
            }
        }
    }
}
```

According to yet alternative embodiments, the likelihood of error estimates can be used (as described above) to drive the decision to try alternatives, or the cost of "good" and "bad" decisions can be incorporated.

Figure 8A:
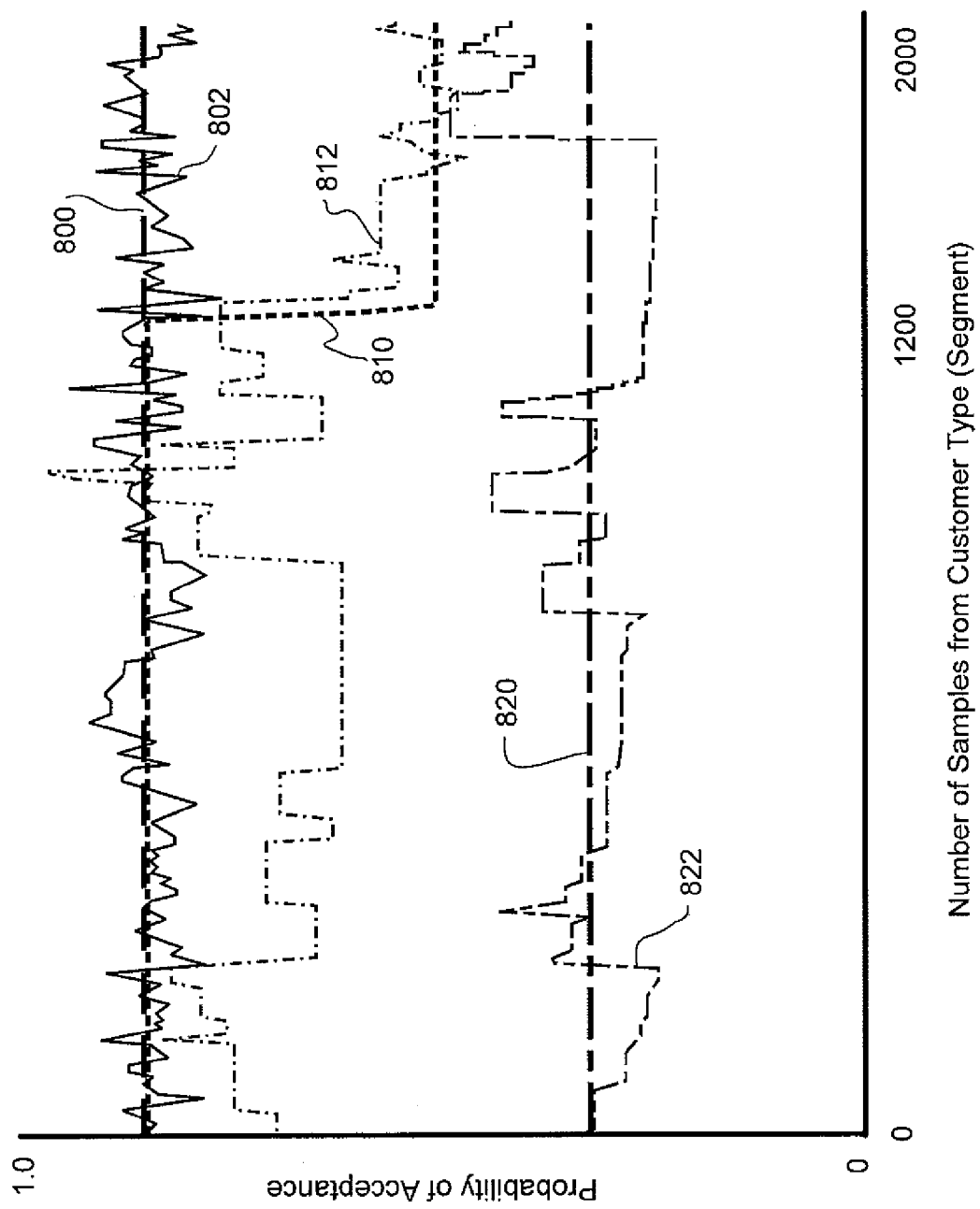
FIGS. 8a and 8b show decisioning scenarios where a decision is being made to make one of thee different offers.
Figure 8B:
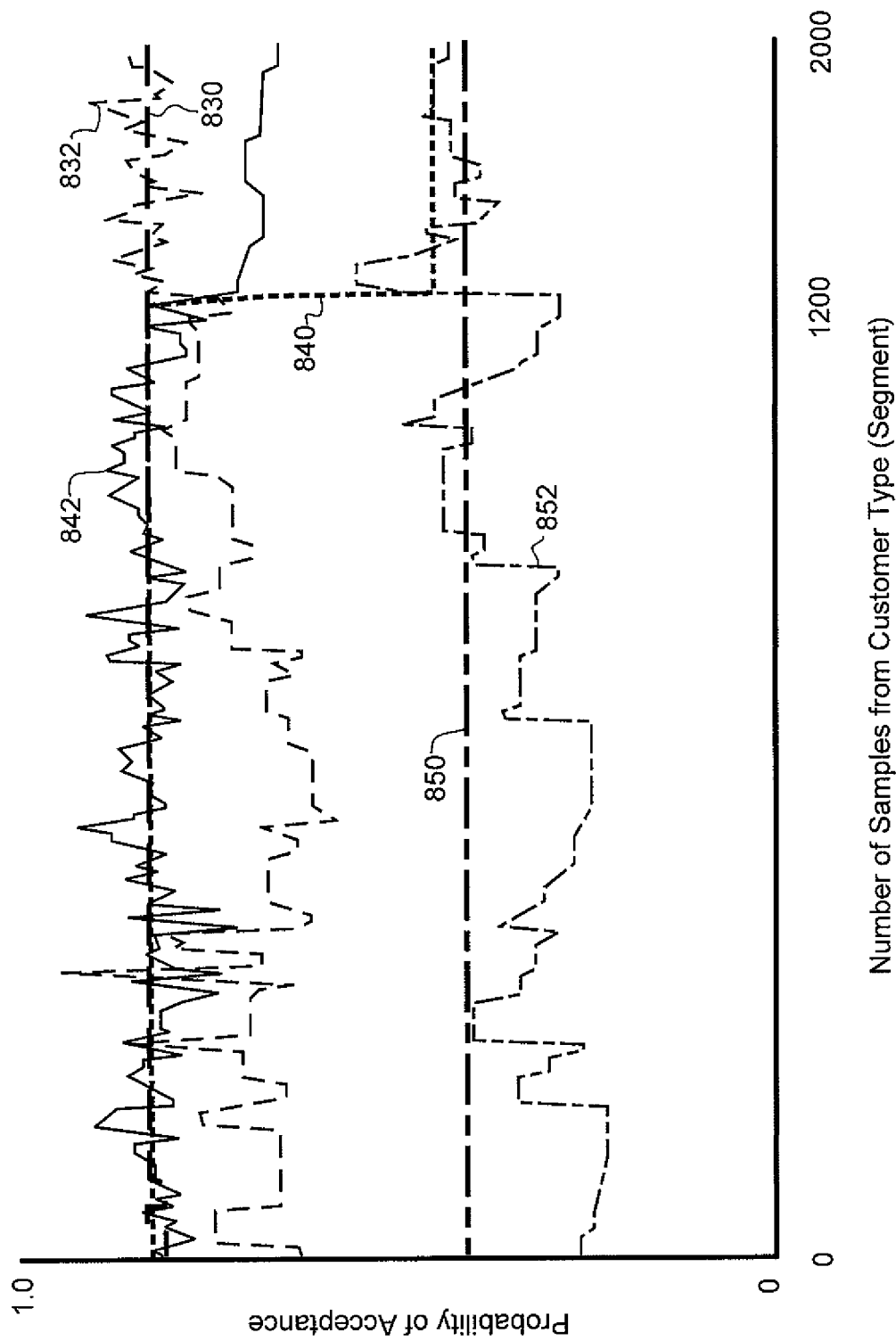

FIGS. 8a and 8b show decisioning scenarios where a decision is being made to make one of thee different offers. In FIG. 8a, Offer A has an associated probability of acceptance 800 which is estimated by the system as estimated acceptance probability curve 802. Offer B has an associated probability of acceptance 810 which is estimated by the system as estimated acceptance probability curve 812. Offer C has an associated probability of acceptance 820 which is estimated by the system as estimated acceptance probability curve 822. The horizontal axis represents the number of samples of a given customer type or segment. As shown, offer B has an abrupt drop in acceptance probability at sample number 1200. The estimates shown in curves 802, 812 and 822 can be calculated using the techniques described herein including variable adaptive learning rates and active experimentation. Initially Offer A and Offer B have very similar acceptance probabilities. As shown, the estimated acceptance probability for Offer A, curve 802 is higher through out most of time frame shown in FIG. 8a. Accordingly, Offer A will be made most of the time since it is believed to be the optimal offer. The alternate offers can be made according to the estimated probability of the alternate offer and also incorporating the learning rate as described above. Therefore, the system also sometimes makes offers for Offer B and Offer C and the results are feedback into the adaptive learning models for those offers. As can be seen in FIG. 8a, the estimated acceptance probability of Offers B and C also are updated as a result of the active experimentation.

In FIG. 8b, Offer A has an associated probability of acceptance 830 which is estimated by the system as estimated acceptance probability curve 832. Offer B has an associated probability of acceptance 840 which is estimated by the system as estimated acceptance probability curve 842. Offer C has an associated probability of acceptance 850 which is estimated by the system as estimated acceptance probability curve 852. The horizontal axis represents the number of samples of a given customer type or segment. As shown, Offer B has an abrupt drop in acceptance probability at sample number 1200. The estimates shown in curves 832, 842 and 852 can be calculated using the techniques described herein including variable adaptive learning rates and active experimentation. As shown, the estimated acceptance probability for Offer B, curve 842 is higher through out most of time frame shown in FIG. 8a prior to sample number 1200. Accordingly, during this time Offer B will be made most of the time since it is believed to be the optimal offer. Alternate offers A and C are made according to the estimated probability of those respective offers as well as the learning rates as described above, and the results are feedback into the adaptive learning models for those offers. After sample number 1200, the estimated acceptance probability for Offer B, shown by curve 842 drops below the estimated acceptance probability for Offer A, shown by curve 832. Thus, Offer A becomes the new optimal offer and is made most of the time, while offers B and C are made according to the active experimentation algorithms described.

Figure 9:
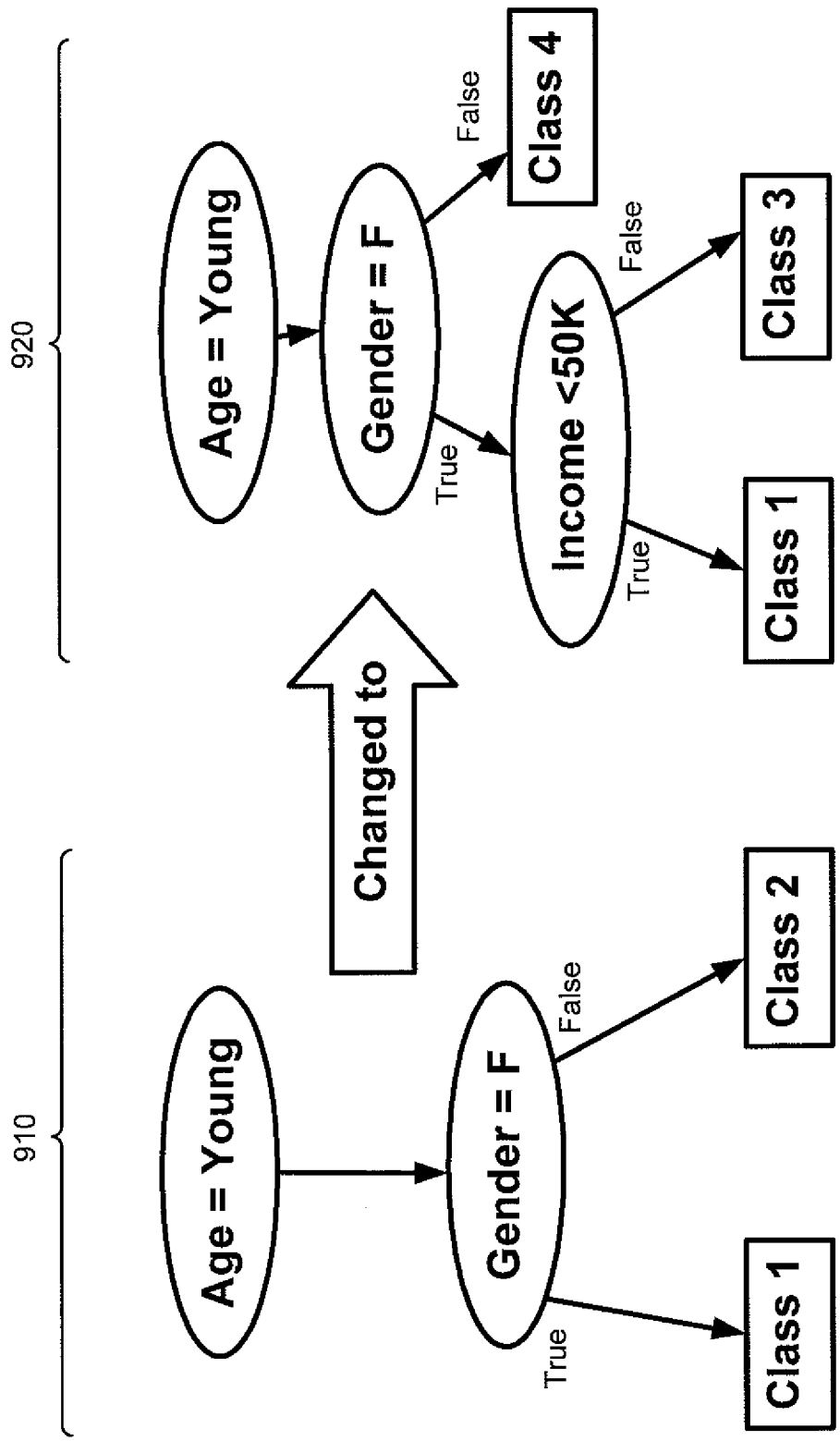
FIG. 9 shows an example of a decision tree algorithm.

The adaptive learning rate and experimentation techniques described herein can be applied to different model types like decision tree and nearest neighbor. FIG. 9 shows an example of a decision tree algorithm. The type of decision tree algorithm shown in FIG. 9 is a concept-adapting very fast decision tree (CVFDT). FIG. 9 shows a decision tree 910 in which young females are put into class 1 and young males are put into class 2. The classes can represent a recommended action such as to make an offer for a "Product A." At some point based on feedback and the statistics collected in the different nodes of the tree), the decision tree algorithm automatically alters itself to decision tree 920, in which young males are now put into class 4, and young females are put into either class 1 or class 3 depending upon whether or not her income is greater than $50K. The decision tree algorithm shown in FIG. 9 uses a set of latest feedback within a 'window' to update the tree and change the configuration. The size of the window—that is the number of examples used to decide if and what updates need to be done to the tree can make used of a variable learning rate such as discussed herein. The methodology to update the learning rate is applied here to update the window size.

In one variation, the following code can be used to update the window size for a decision tree algorithm.

```
movingResult = Avg(LastNFeedback); //feedback is 1 - true or 0 - false
movingAccuracy=Avg(LastNMovingResult);
float tmpFactor = movingResult/ movingAccuracy;
newWindowSize = oldWindowSize * tmpFactor
Bind(newWindowSize,1,MaxWindowSize) //make sure newWindowSize
is between 1 and MaximumWindowSize
if difference(newWindowSize, oldWindowSize)>threshold
    oldWindowSize = newWindowSize
```

Figure 10:
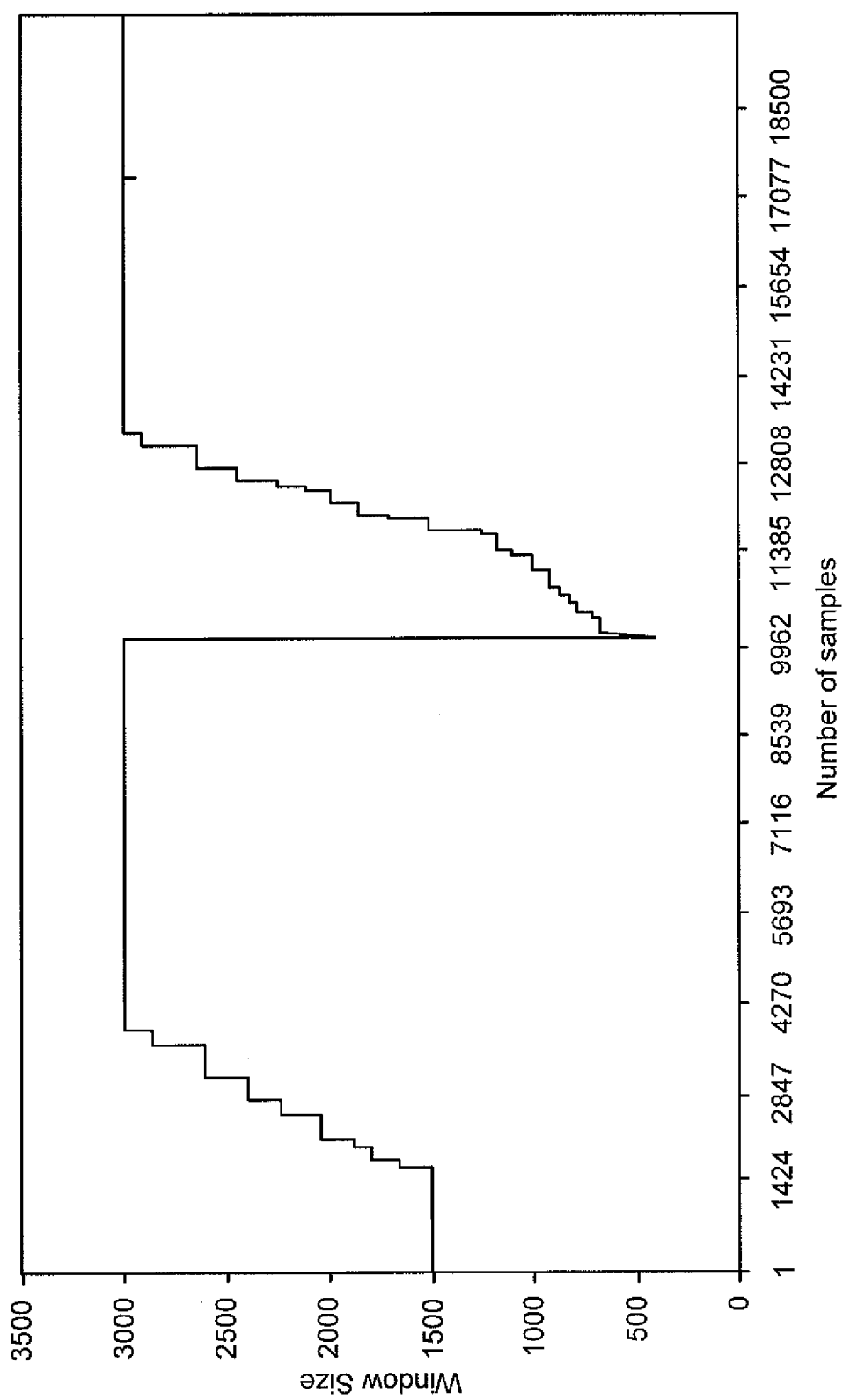
FIG. 10 shows a window size for a decision tree algorithm that is dynamically re-resized.
Figure 11:
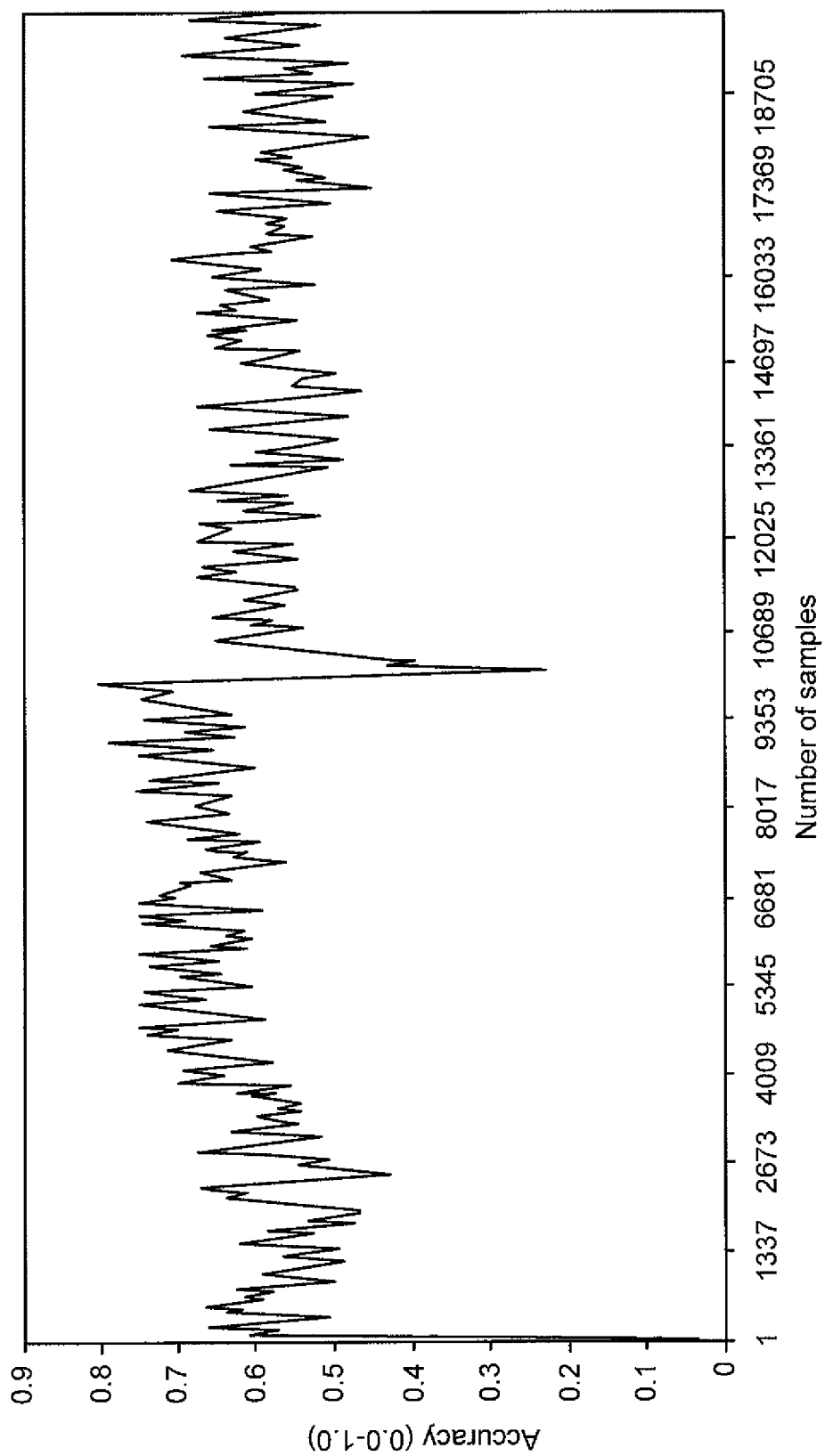
FIG. 11 shows accuracy associated with a dynamically resized window decision tree algorithm.

FIG. 10 shows a window size for a decision tree algorithm that is dynamically re-resized. FIG. 11 shows accuracy associated with a dynamically resized window decision tree algorithm. As shown in FIGS. 10 and 11, with the window size being updated based on the feedback, the performance is maintained and in case the performance drops due to changes in the underlying data, the window size decreases, the tree gets changed and catches up to the changed data. This brings back the performance to the old level.

One decision tree can be used for each offer. For a given input value, the tree for different offers is used and the offers are compared. When choosing from multiple offers, using different trees, the best offer is not always chosen. The alternate offer selection mechanism is applied here as well and the non optimal offers are chosen to get data points for non optimal offers.

Figure 12:
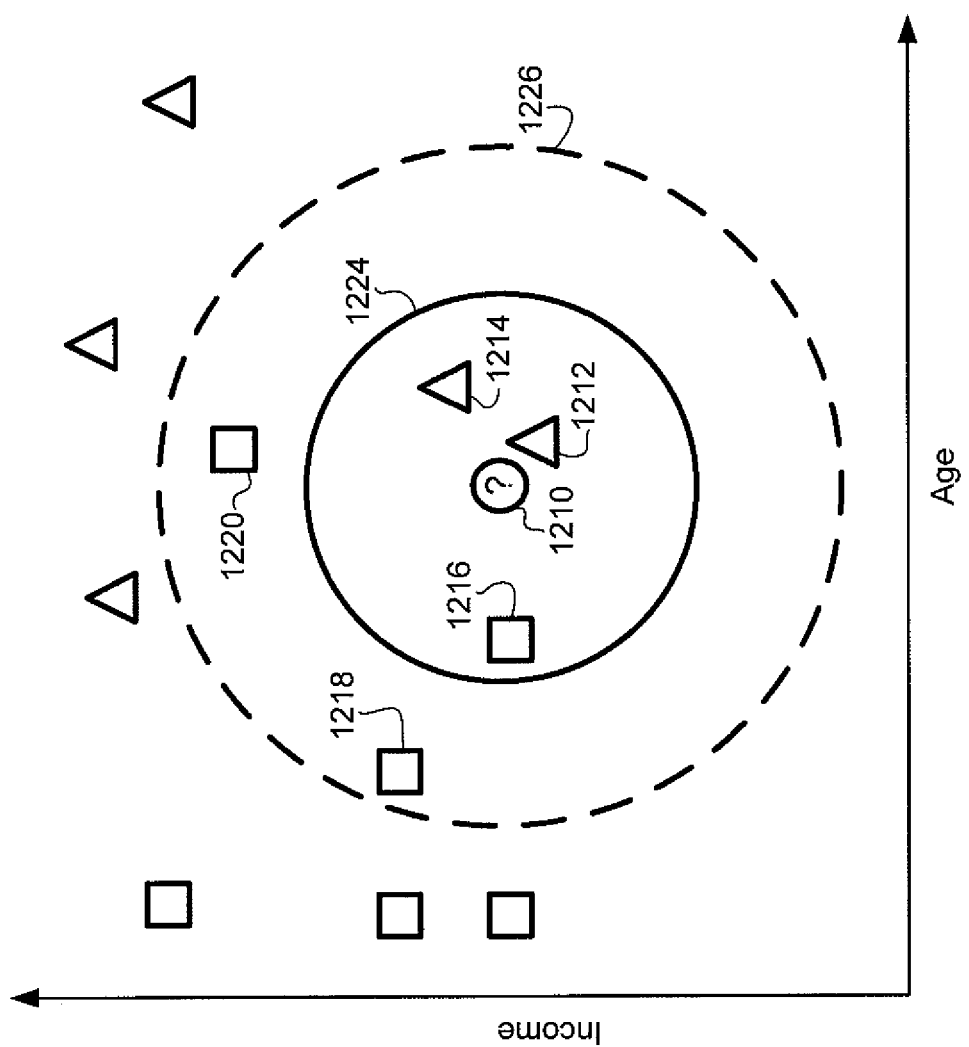
FIG. 12 shows adaptive learning techniques used in the context of a nearest neighbor decisioning algorithm.

FIG. 12 shows adaptive learning techniques used in the context of a nearest neighbor decisioning algorithm. The algorithm uses a set of examples in the neighborhood of the point of interest 1210 and uses the mode of those points to get the prediction. The square and triangle symbols can represent various aspect according to the application. For example, they may represent two different actions (e.g. "Action A" and "Action B") where the actions can be making an offer for a product, selecting an agency or placing an ad. The symbols can also represent successful results form such actions. There can be different neighbor spaces as shown in FIG. 12 for each of several alternative offers. In this case the square symbols can represent that the offer in question was accepted and the triangles symbols represent that the offer was rejected. The space represents, in this example, age on the horizontal axis and income on the vertical axis. According to the model, a number "k" of neighbors are considered for each analysis. The number k of examples are chosen based on their distances from the point of interest. If k=3, for example which is shown by solid circle 1224 for point of interest 1210, the two triangles 1212 and 1214 out number the on square 1216. Thus the prediction from the model is that the offer will be rejected. However, if k=5 for the same point of interest (i.e. combination of age and income) 1210, then squares 1218 and 1220 are considered and the predicted output from the model is that the offer will be accepted.

As more feedback is gathered with time, more and more examples or data points are placed on the neighborhood space shown in FIG. 12. A window size that is equal to the number of data points available for use in the nearest neighbor model can be adaptively adjusted according to the techniques discussed herein. As time progresses, if the composition of the neighborhood points changes, the predicted value also changes. Applying the adaptive approach to updating the window size and thereby changing the points based on which the prediction for a given point is made forces the system to adapt to the changes in the underlying data.

The updates to the window size occur in a manner analogous to the way the learning rate is updated, as described above. When the window size is updated based on performance of the system, the nearest neighbor model adapts to the changes. The following code can be used to update the window size used in a nearest neighbor algorithm.

```
/*Change the window size adaptively*/
/* for segment s */
if (s>0) {
    /*If the outcome is improved, slightly increase the window size*/
    if(misClas_adaptive[s]<=misClas_adaptive[s-1])
        adaptive_windowsize=adaptive_windowsize+1;
    else{
    /*If the degradation of outcome exceed a threshold, sharply decrease
the window size*/
        double camp=(double)((misClas_adaptive[s] - misClas_adaptive[s-
1]))/(query_size*groups);
        if (camp >=0.03)
            adaptive_windowsize=int(adaptive_windowsize*(0.7-3*camp))
    /*Minimal window size is equal to one*/
    if (adaptive_windowsize<1)
        adaptive_windowsize=1;
}
```

FIG. 13*a*. shows error rates for nearest neighbor algorithms having different window sizes. As can be seen from FIG. 13*a*, the lowest error rates are obtained by implementing an adaptive window size. FIG. 13*b* shows the adaptively updated window size that were used for the data shown in FIG. 13*a*. The dynamically updated window size nearest neighbor algorithm is applied to decisioning, that is making decisions between two or more alternative actions. According embodiments, different nearest neighbor algorithms—one for each offer, are used to choose alternative offers. As described herein, active experimentation is used to explore the non optimal offers and find out if those offers have increased in terms of their preference.

Several example embodiments of variable learning rate decisioning systems will now be described in further detail. In a marketing setting, the objective is often to make the right offer to the customer who walks in to a store or call a customer service center. The same customer might not prefer the same thing at various time instances. Over time, preferences of customers change and so the same offer might not work later, even though it would have worked in the past. To counter this problem, the decision system as described herein is used to make decisions on what to offer. The system advantageously adapts to the changing reaction to offers and adjust itself to detect and react to the changing preferences. In order to more efficiently detect changes, the system also performs experimentation by making non optimal decisions as a means of exploring the various offers and seeing if the response rate for the different offers has changed. This constant experimentation and adaptation leads to the system being able to help with making the offer recommendation decision, even if the preferences changes.

Figure 14:
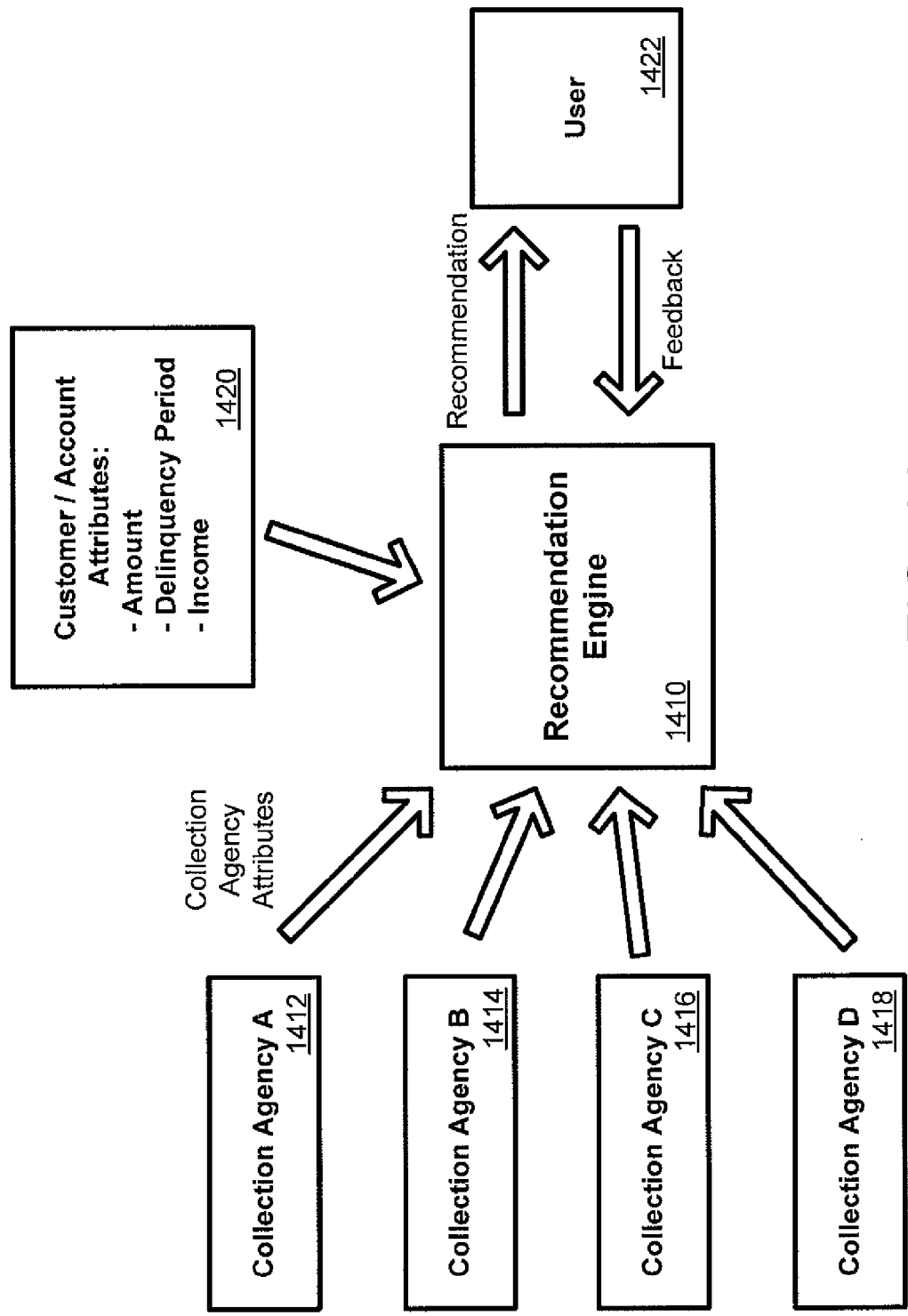
FIG. 14 shows an example of a decisioning system for recommending which of several collection agencies is to be used for delinquent accounts.

The decisioning techniques described herein can be applied to decisioning in the context of a buyer deciding which product or service to purchase or use. FIG. 14 shows an example of a decisioning system for recommending which of several collection agencies is to be used for delinquent accounts. In many cases, certain collection agencies are good at collecting from certain types of accounts. Also, due to changes in the agencies, their strategies, staffing, etc., over time, their effectiveness with one customer type reduces and increases with a different type. A system using a model built using training data from a certain time period might not make the best account assignment as the agencies change over time. To avoid having to rebuilding the model and the inefficiencies associated with using a less than optimal model, an adaptive system is used. Recommendation engine 1410 uses one or more adaptive models as described herein to estimate the probability of successful collection for each of four collection agencies: Collection Agency A 1412, Collection Agency B 1414, Collection Agency C 1416, and Collection Agency D 1418. The adaptive model(s) within Engine 1410 take in to account the attributes of the delinquent customer account 1420, such as the amount of the customer owes, the delinquency period, and the income of the customer in a fashion analogous to the way the customer attributes such as age, income, and gender were accounted for in the models of FIG. 2. Specifically, a separate Bayesian Network can be used for each agency. Additionally, the model(s) in Engine 1410 can also account for attributes of the particular collection agencies, which may be changing over time. Engine 1410 makes its recommendation to User 1422 which the user usually follows. The user 1422 then returns feedback to Engine 1410 which includes information on whether a successful collection was made and/or how much was collected from the customer. Engine 1410 monitors the performance of each agency and adjusts the adaptive model(s) such that the account assignments are made to increase the system's performance even as the agencies and accounts change their behavior. To achieve this, the adaptive decision system also actively experiments by recommending non-optimal assignments to gain new information and update the model with this information, as described herein.

Figure 15:
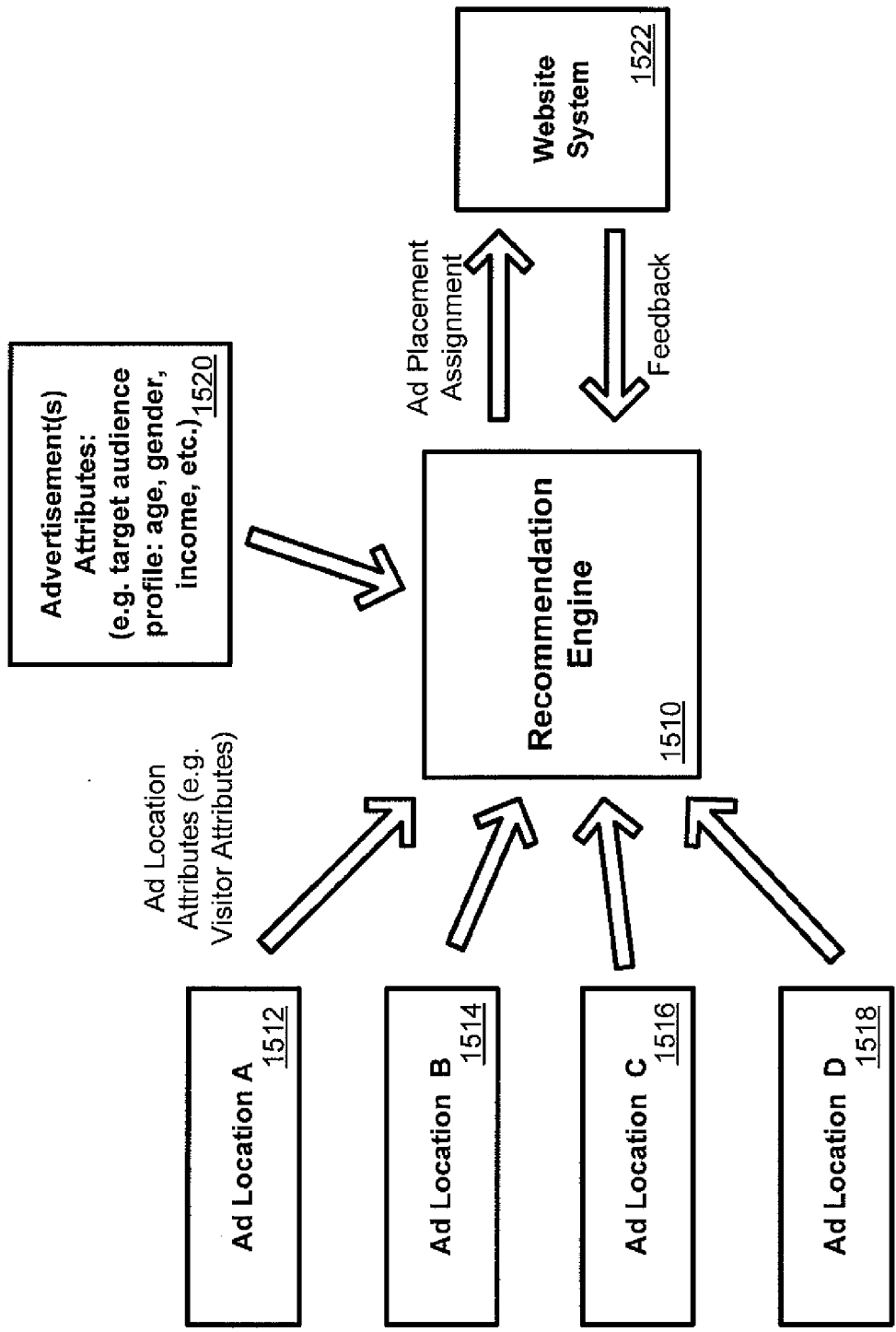
FIG. 15 shows and example of a decisioning system for recommending placement of advertisements on web pages.

FIG. 15 shows and example of a decisioning system for recommending placement of advertisements on web pages. Placing a good advertisement on the right page in a web site increases the rate at which the ads are clicked. Yet, over time, the contents and the target audience for the page typically change. Additionally, the demographics of the visitors to the page change over time, requiring that the kind of advertisements shown on a web page also change. Recommendation engine 1510 uses one or more adaptive models as described herein to estimate the probability of successful ad placement for each of several ad locations. Shown in FIG. 15 are four ad locations: Ad Location A 1512, Ad Location B 1514, Ad Location C 1516, and Ad Location D 1518. The locations corresponding to Ad Locations A-D can be for example on different web-pages, as well as the location on the individual web page. The adaptive model(s) within Engine 1510 take in to account the attributes of the Advertisement to be placed 1520. Examples of Ad Attributes 1520 are attributes of the target audience such as the value of the age, gender and income. As described herein a plurality of separate Bayesian Networks can be used within the adaptive model(s). Additionally, the model(s) in Engine 1510 can also account for attributes of the particular ad locations, which may be changing over time. Engine 1510 makes its ad placement assignment to Website System 1522. Website system 1522 can be a plurality web page advertisement placement systems corresponding to each website management system. The Website System 1522 returns feedback to Engine 1510 which typically includes the number of clicks on the placed advertisement. Engine 1510 monitors the performance of the advertisements in terms of click through rate and changes the recommendation on the kind of advertisement to be placed. If the interest in a particular advertisement wanes in a web page, the system is in a position to recommend alternate ads to show. This is made possible by active experimentation as described herein. Recommendation engine 1510 shows advertisements to alternate ad locations at certain intervals to obtain response rates for various other locations. This information would then be used to make changes to the model and eventually change the recommendations made in terms of which ads to show in what locations. According to further embodiments, Ad Attributes 1520 can also include several alternate advertisements which the decisioning system considers. Recommendation engine 1510 contains networks for predicting the number of clicks (or a threshold click rate that is considered successful), for each of a plurality of alternate advertisements at different locations. According to these embodiments, the recommendation engine 1510 also actively experiments by assigning non-optimal alternate advertisements in various locations.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, while some of the variations described herein have been described for some applications, other uses of the adaptive decisioning systems include applications such as fraud detection systems, where an adaptive decisioning system is used to react quickly to emerging fraudulent behavior. In addition, the logic flow depicted in the accompanying figures and/or described herein do not require the particular order shown, or sequential order, to achieve desirable results. Other embodiments may be within the scope of the following claims.

What is claimed is:

1. An adaptive decisioning system for making decisions between available choices, the system comprising:
a processor arranged and programmed to select a choice from the available choices based at least in part on evaluating a plurality of prior outcomes for the available choices, the processor being a computer processor forming part of at least one computing system,
an input/output system in communication with the processor and arranged to communicate the selected choice to a user and to receive an outcome relating to the selected choice,
wherein the processor, using at least one model, automatically learns from the outcome by basing at least some subsequently calculated estimated probabilities on the outcome, and adjusts a variable learning rate at which the outcome is incorporated in the subsequently calculated estimated probabilities;
wherein each model estimates a probability of accepting an offer i at time t by:

$$\hat{p}_i(t) = (1-\eta)\hat{p}_i(t-1) + \eta I_i(t)$$

where $\eta$ is a learning rate parameter that controls how much the prior outcomes are relied upon;
wherein as $\eta$ approaches 1, the prior outcomes are weighted less, and as $\eta$ approaches zero, the network parameters change from a previous model;

wherein $I_i(t)$ is a feedback indicator function for offer i at the time t, which can be either 1 or 0:

$$I_i(t) = \begin{cases} 1 & \text{with probability } p_i \\ 0 & \text{with probability } 1 - p_i \end{cases}.$$

2. A system according to claim 1 wherein the processor is further programmed to calculate a first estimated probability associated with a first choice based at least in part on evaluating a plurality of first prior outcomes for the first choice, and to calculate a second estimated probability associated with a second choice based at least in part on evaluating a plurality of second prior outcomes for the second choice, wherein the selection of a choice is based at least in part on the calculated first and second estimated probabilities.

3. A system according to claim 1 wherein the adjustment of the variable learning rate is based at least in part on an estimate of a first drift of the estimated probability associated with the first choice and an estimate of a second drift of the estimated probability associated with the second choice, the first and second drifts being estimated by calculating a difference between each estimated probability and the actual probability.

4. A system according to claim 3 wherein the calculating makes use of at least one Bayesian network.

5. A system according to claim 1 wherein the processor is arranged and programmed to select a choice having a highest estimated probability between the estimated probabilities.

6. A system according to claim 1 where the processor is further programmed to calculate a first profit estimate based on the first estimated probability and a first associated profit; and a second profit estimate based on the second estimated probability and a second associated profit, and wherein the processor is arranged and programmed to select a choice having a highest profit estimate between the first and second profit estimates.

7. A system according to claim 1 wherein the processor is further programmed such that the selected choice is at least sometimes a non-optimal choice, which does not have a highest estimated probability between the estimated probabilities, so as to obtain an outcome relating to the non-optimal choice, the non-optimal choice having an estimated probability which is lower than the highest estimated probability.

8. A system according to claim 7 wherein the non-optimal choice is selected at a rate based at least in part on the variable learning rate.

9. A computer-implemented method for adaptively making decisions between available choices including at least a first choice and a second choice, the method being performed by execution of computer readable program code by one or more processors of one or more computer systems, the one or more processors being computer processors, the method comprising:
selecting, by one or more processors, a choice from the available choices;
receiving, by one or more processors, an outcome relating to the selected choice; and
automatically learning from the received outcome by incorporating, by one or more processors using at least one model, at a variable learning rate, the received outcome into subsequent steps of selecting a choice;
wherein each model estimates a probability of accepting an offer i at time t by:

$$\hat{p}_i(t) = (1-\eta)\hat{p}_i(t-1) + \eta I_i(t)$$

where η is a learning rate parameter that controls how much the prior outcomes are relied upon;

wherein as η approaches 1, the prior outcomes are weighted less, and as η approaches zero, the network parameters change from a previous model;

wherein $I_i$ (t) is a feedback indicator function for offer i at the time t, which can be either 1 or 0:

$$I_i(t) = \begin{cases} 1 \text{ with probability } p_i \\ 0 \text{ with probability } 1 - p_i \end{cases}.$$

10. A computer-implemented method according to claim 9 further comprising:
calculating, by one or more processors, a first estimated probability associated with the first choice;
calculating, by one or more processors, a second estimated probability associated with the second choice,
wherein the step of selecting a choice is based at least in part upon the calculated first and second estimated probabilities, and the received outcome is incorporated, by one or more processors at the variable learning rate, into subsequent steps of calculating estimated probability associated with the selected choice.

11. A computer-implemented method according to claim 10 wherein the learning rate is variable with time, the learning rate influencing the degree on which prior outcomes are relied upon when calculating an estimated probability associated with a choice, and the learning rate being a function of time and an estimate of a drift of the probability associated with the selected choice.

12. A computer-implemented method according to claim 9 wherein the learning rate is variable with time, the learning rate influencing the degree on which prior outcomes are relied upon when selecting a choice.

13. A computer-implemented method according to claim 9 wherein the selecting a choice from the available choices includes at least sometimes selecting a non-optimal choice, which does not have a highest estimated probability between the available choices, so as to obtain an outcome relating to the non-optimal choice.

14. A computer-implemented method according to claim 13 wherein the non-optimal choice is selected at a rate based at least in part on the variable learning rate.

15. A computer-implemented method according to claim 10 wherein the selecting a choice from the available choice includes at least sometimes selecting a non-optimal choice, which does not have a highest estimated probability between the available choices, so as to obtain a non-optimal outcome relating to the non-optimal choice, the non-optimal choice being selected at an increased rate when the variable is increased.

16. A computer-implemented method according to claim 10 wherein the calculating first and second estimated probabilities comprises the use of one or more Bayesian networks.

17. A computer-implemented method according to claim 16 wherein at least one Bayesian network is associated with each estimated probabilities.

18. A computer-implemented method according to claim 9 wherein the choice having a highest estimated probability between the estimated probabilities is selected.

19. A computer-implemented method according to claim 10 further comprising calculating a first profit estimate based on the first estimated probability and a first associated profit; and estimating a second profit estimate based on the second estimated probability and a second associated profit, and wherein the choice having a highest profit estimate between the profit estimates is selected.

20. A computer-implemented method according to claim 9 wherein the selecting a choice is based at least in part on an automatically adapting decision tree based algorithm.

21. A computer-implemented method according to claim 20 wherein the decision tree based algorithm automatically re-arranges one or more structures within the decision tree based on the variable learning rate the variable learning rate being variable with time and being a function of accuracy of prior selected choices.

22. A computer-implemented method according to claim 20 wherein the selecting a choice from the available choices includes at least sometimes selecting a non-optimal choice, which does not have a highest estimated probability between the available choices, so as to obtain a non-optimal outcome relating to the non-optimal choice.

23. A computer-implemented method according to claim 9 wherein the selecting a choice is based at least in part on an automatically adapting nearest neighbor algorithm.

24. A computer-implemented method according to claim 23 wherein the nearest neighbor algorithm uses a number of prior received outcomes, said number being variable with time and being a function of accuracy of prior selected choices.

25. A computer-implemented method according to claim 23 wherein the selecting a choice from the available choices includes at least sometimes selecting a non-optimal choice, which does not have a highest estimated probability between the available choices, so as to obtain a non-optimal outcome relating to the non-optimal choice.

26. A computer-implemented method according to claim 9 wherein the choices represent offers for sale of goods or services.

27. A computer-implemented method according to claim 9 wherein the choices represent alternative purchasing options.

28. A computer-implemented method according to claim 9 wherein the choices represent alternative services to use.

29. A computer-implemented method according to claim 9 wherein the choices represent choices relating to placement of advertisements on web pages.

30. A computer-implemented method for adaptively making decisions between available choices including at least a first choice and a second choice using at least one model, the method being performed by execution of computer readable program code by one or more processors of one or more computer systems, the one or more processors being computer processors, the method comprising:
receiving, by one or more processors, a plurality of first choice outcome values each representing an outcome for the first choice occurring at an earlier time;
receiving, by one or more processors, a plurality of second choice outcome values each representing an outcome for the second choice occurring at an earlier time;
calculating, by one or more processors, a first estimated probability associated with the first choice based at least in part on evaluating a number of the first choice outcome values;
calculating, by one or more processors, a second estimated probability associated with the second choice based at least in part on evaluating a number of the second choice outcome values; and
selecting, by one or more processors, a choice from the available choices based at least in part upon the calculated first and second estimated probabilities;
wherein each of first and second estimated probabilities is calculated based at least in part, on a respective variable learning rate wherein each model estimates a probability of accepting an offer i at time t by:

$$\hat{p}_i(t) = (1-\eta)\hat{p}_i(t-1) + \eta I_i(t)$$

where $\eta$ is a learning rate parameter that controls how much the prior outcomes are relied upon;

wherein as $\eta$ approaches 1, the prior outcomes are weighted less, and as $\eta$ approaches zero, the network parameters change from a previous model;

wherein $I_i(t)$ is a feedback indicator function for offer i at the time t, which can be either 1 or 0:

$$I_i(t) = \begin{cases} 1 & \text{with probability } p_i \\ 0 & \text{with probability } 1 - p_i \end{cases}.$$

31. A computer-implemented method according to claim 30 wherein the variable learning rate is adjusted based at least in part on a difference between the respective estimated probability and an actual probability.

32. A computer-implemented method according to claim 30 wherein the calculating makes use of at least one Bayesian network.

33. A computer-implemented method according to claim 30 wherein the selecting a choice from the available choices includes at least sometimes selecting a non-optimal choice, which does not have a highest estimated probability between the available choices, so as to obtain a non-optimal outcome relating to the non-optimal choice.

34. A computer-implemented method according to claim 33 wherein the non-optimal choice is selected at an increased rate when the variable learning rate increases.

35. A computer-implemented method according to claim 30 further comprising recommending the selected choice to a user.

36. A computer-implemented method according to claim 30, wherein separate models $\hat{p}(t)$ can be used for each combination of segment and offer type associated with the user.

37. A computer-implemented method according to claim 36, wherein an optimum offer to make to the user in a particular segment at a given time is provided by:

$$i^*(t) = \underset{i}{\operatorname{argmax}} \, \hat{p}_i(t).$$

* * * * *